(12) United States Patent
Keil et al.

(10) Patent No.: US 9,879,746 B2
(45) Date of Patent: Jan. 30, 2018

(54) ROD GUIDE SYSTEM AND METHOD WITH MULTIPLE SOLENOID VALVE CARTRIDGES AND MULTIPLE PRESSURE REGULATED VALVE ASSEMBLIES

(71) Applicant: Tenneco Automotive Operating Company Inc., Lake Forest, IL (US)

(72) Inventors: Daniel T. Keil, Temperance, MI (US); Matthew L. Roessle, Temperance, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 152 days.

(21) Appl. No.: 14/738,332

(22) Filed: Jun. 12, 2015

(65) Prior Publication Data

US 2015/0276001 A1 Oct. 1, 2015

Related U.S. Application Data

(63) Continuation-in-part of application No. 14/211,318, filed on Mar. 14, 2014, now Pat. No. 9,404,551.

(Continued)

(51) Int. Cl.
*F16F 9/34* (2006.01)
*F16F 9/32* (2006.01)
*F16F 9/516* (2006.01)

(52) U.S. Cl.
CPC .............. *F16F 9/34* (2013.01); *F16F 9/3271* (2013.01); *F16F 9/5165* (2013.01); *Y10T 29/49117* (2015.01)

(58) Field of Classification Search
CPC ........... F16F 9/34; F16F 9/3271; F16F 9/5165
See application file for complete search history.

(56) References Cited

U.S. PATENT DOCUMENTS 2,409,349 A 10/1946 Focht
2,473,043 A 6/1949 Whisler, Jr.
(Continued)

FOREIGN PATENT DOCUMENTS

CN 1094855 C 11/2002
CN 1267611 C 8/2006
(Continued)

OTHER PUBLICATIONS

International Search Report and Written Opinion dated Sep. 21, 2015 in corresponding PCT Application No. PCT/US2015/035568 (9 pages).

(Continued)

*Primary Examiner* — Vishal R Sahni
(74) *Attorney, Agent, or Firm* — Harness, Dickey & Pierce, P.L.C.

(57) ABSTRACT

The present disclosure relates to a shock absorber having a pressure tube forming a pressure chamber. A piston rod is disposed within the pressure chamber. A reserve tube defines a reserve chamber adjacent the pressure tube. A rod guide assembly is concentrically disposed about the piston rod and the pressure chamber and houses a plurality of digital valves. Each one of the digital valves includes a component which is moveable between an open state and a closed state, and thus helps to control a fluid flow between the pressure chamber and the reserve chamber. An electronic control system is disposed on a printed circuit board assembly (PCBA) and controls actuation of the digital valves. At least one additional valve is associated with one of the digital valves for further controlling a flow of fluid between the pressure chamber and the reserve chamber.

22 Claims, 23 Drawing Sheets

Related U.S. Application Data

(60) Provisional application No. 62/011,736, filed on Jun. 13, 2014, provisional application No. 61/787,004, filed on Mar. 15, 2013, provisional application No. 61/787,169, filed on Mar. 15, 2013.

(56) References Cited

U.S. PATENT DOCUMENTS

| | | |
|---|---|---|
| 3,896,908 A | 7/1975 | Petrak |
| 3,945,474 A | 3/1976 | Palmer |
| 4,317,105 A | 2/1982 | Sinha et al. |
| 4,352,417 A | 10/1982 | Stinson |
| 4,468,050 A | 8/1984 | Woods et al. |
| 4,552,324 A | 11/1985 | Hrusch |
| 4,564,214 A | 1/1986 | Tokunaga et al. |
| 4,589,528 A | 5/1986 | Axthammer et al. |
| 4,591,186 A | 5/1986 | Ashiba |
| 4,696,489 A | 9/1987 | Fujishiro et al. |
| 4,723,640 A | 2/1988 | Beck |
| 4,726,453 A | 2/1988 | Obstfelder et al. |
| 4,749,070 A | 6/1988 | Moser et al. |
| 4,776,437 A | 10/1988 | Ishibashi et al. |
| 4,788,489 A | 11/1988 | Kobayashi et al. |
| 4,846,317 A | 7/1989 | Hudgens |
| 4,850,460 A | 7/1989 | Knecht et al. |
| 4,867,476 A | 9/1989 | Yamanaka et al. |
| 4,872,537 A | 10/1989 | Warner |
| 4,892,328 A | 1/1990 | Kurtzman et al. |
| 4,909,536 A | 3/1990 | Hale |
| 4,913,457 A | 4/1990 | Hafner et al. |
| 4,943,083 A | 7/1990 | Groves et al. |
| 4,958,706 A | 9/1990 | Richardson et al. |
| 4,969,662 A | 11/1990 | Stuart |
| 4,973,854 A | 11/1990 | Hummel |
| 4,984,819 A | 1/1991 | Kakizaki et al. |
| 4,986,393 A | 1/1991 | Preukschat et al. |
| 4,988,967 A | 1/1991 | Miller et al. |
| 5,038,613 A | 8/1991 | Takenaka et al. |
| 5,058,715 A | 10/1991 | Silberstein |
| 5,067,743 A | 11/1991 | Kokubo et al. |
| 5,092,626 A | 3/1992 | Athanas et al. |
| 5,106,053 A | 4/1992 | Miller et al. |
| 5,123,671 A | 6/1992 | Driessen et al. |
| 5,133,434 A | 7/1992 | Kikushima et al. |
| 5,133,574 A | 7/1992 | Yamaoka et al. |
| 5,143,185 A | 9/1992 | Klein et al. |
| 5,154,442 A | 10/1992 | Milliken |
| 5,160,162 A | 11/1992 | Mouri et al. |
| 5,189,614 A | 2/1993 | Mitsuoka et al. |
| 5,200,895 A | 4/1993 | Emura et al. |
| 5,242,190 A | 9/1993 | Morris |
| 5,285,878 A | 2/1994 | Scheffel et al. |
| 5,293,968 A | 3/1994 | Schuelke et al. |
| 5,299,488 A | 4/1994 | Kadlicko et al. |
| 5,337,863 A | 8/1994 | Lizell |
| 5,350,187 A | 9/1994 | Shinozaki |
| 5,350,983 A | 9/1994 | Miller et al. |
| 5,360,089 A | 11/1994 | Nakamura et al. |
| 5,360,230 A | 11/1994 | Yamada et al. |
| 5,363,945 A | 11/1994 | Lizell et al. |
| 5,383,679 A * | 1/1995 | Nakamura ........... B60G 15/067 188/266.1 |
| 5,390,121 A | 2/1995 | Wolfe |
| 5,396,973 A | 3/1995 | Schwemmer et al. |
| 5,404,973 A | 4/1995 | Katoh et al. |
| 5,430,648 A | 7/1995 | Sasaki |
| 5,435,421 A | 7/1995 | Beck |
| 5,439,085 A | 8/1995 | Woessner |
| 5,485,417 A | 1/1996 | Wolf et al. |
| 5,487,455 A | 1/1996 | Feigel |
| 5,488,556 A | 1/1996 | Sasaki |
| 5,497,325 A | 3/1996 | Mine |
| 5,497,862 A | 3/1996 | Hoya |
| 5,532,921 A | 7/1996 | Katsuda |
| 5,570,762 A | 11/1996 | Jentsch et al. |
| 5,577,579 A | 11/1996 | Derr |
| 5,590,898 A | 1/1997 | Williams et al. |
| 5,597,054 A | 1/1997 | Nagai et al. |
| 5,632,503 A | 5/1997 | Raad et al. |
| 5,638,275 A | 6/1997 | Sasaki et al. |
| 5,653,315 A | 8/1997 | Ekquist et al. |
| 5,655,633 A | 8/1997 | Nakadate et al. |
| 5,656,315 A | 8/1997 | Tucker et al. |
| 5,657,840 A | 8/1997 | Lizell |
| 5,690,195 A | 11/1997 | Kruckemeyer et al. |
| 5,725,239 A | 3/1998 | de Molina |
| 5,775,470 A | 7/1998 | Feigel |
| 5,803,482 A | 9/1998 | Kim |
| 5,833,036 A | 11/1998 | Gillespie |
| 5,845,672 A | 12/1998 | Reuter et al. |
| 5,860,497 A | 1/1999 | Takahashi |
| 5,878,851 A | 3/1999 | Carlson et al. |
| 5,890,081 A | 3/1999 | Sasaki |
| 5,913,391 A | 6/1999 | Jeffries et al. |
| 5,934,421 A | 8/1999 | Nakadate et al. |
| 5,937,976 A | 8/1999 | Grundei |
| 5,950,775 A | 9/1999 | Achmad |
| 5,967,268 A | 10/1999 | de Molina et al. |
| 5,987,369 A | 11/1999 | Kwak et al. |
| 5,996,745 A | 12/1999 | Jones, Jr. et al. |
| 6,003,644 A | 12/1999 | Tanaka |
| 6,036,500 A | 3/2000 | Francis et al. |
| 6,092,011 A | 7/2000 | Hiramoto |
| 6,095,489 A | 8/2000 | Kaneko et al. |
| 6,105,740 A | 8/2000 | Marzocchi et al. |
| 6,109,400 A | 8/2000 | Ayyildiz et al. |
| 6,135,250 A | 10/2000 | Forster et al. |
| 6,155,391 A | 12/2000 | Kashiwagi et al. |
| 6,213,262 B1 | 4/2001 | Bell |
| 6,273,224 B1 | 8/2001 | Achmad |
| 6,296,091 B1 | 10/2001 | Hamilton |
| 6,298,958 B1 | 10/2001 | Hwang |
| 6,302,248 B1 | 10/2001 | Nakadate |
| 6,321,888 B1 | 11/2001 | Reybrouck et al. |
| 6,343,677 B2 | 2/2002 | Bell |
| 6,427,986 B1 | 8/2002 | Sakai et al. |
| 6,460,664 B1 | 10/2002 | Steed et al. |
| 6,464,053 B1 | 10/2002 | Hoebrechts |
| 6,496,761 B1 | 12/2002 | Ulyanov et al. |
| 6,533,294 B1 | 3/2003 | Germain et al. |
| 6,588,726 B2 | 7/2003 | Osterhart et al. |
| 6,616,124 B2 | 9/2003 | Oliver et al. |
| 6,651,787 B2 | 11/2003 | Grundei |
| 6,655,512 B2 | 12/2003 | Moradmand et al. |
| 6,672,436 B1 | 1/2004 | Keil et al. |
| 6,707,290 B2 | 3/2004 | Nyce et al. |
| 6,708,803 B2 | 3/2004 | Jensen |
| 6,782,980 B2 | 8/2004 | Nakadate |
| 6,814,193 B2 | 11/2004 | Grundei |
| 6,851,528 B2 | 2/2005 | Lemieux |
| 6,879,898 B2 | 4/2005 | Ghoneim et al. |
| 6,904,344 B2 | 6/2005 | LaPlante et al. |
| 6,959,797 B2 | 11/2005 | Mintgen et al. |
| 6,964,325 B2 | 11/2005 | Maes |
| 6,978,872 B2 | 12/2005 | Turner |
| 7,032,912 B2 | 4/2006 | Nicot et al. |
| 7,168,709 B2 | 1/2007 | Niwa et al. |
| 7,214,103 B2 | 5/2007 | Kim et al. |
| 7,234,574 B2 | 6/2007 | Matsunaga et al. |
| 7,234,707 B2 | 6/2007 | Green et al. |
| 7,273,138 B2 | 9/2007 | Park |
| 7,286,919 B2 | 10/2007 | Nordgren et al. |
| 7,318,595 B2 | 1/2008 | Lamela et al. |
| 7,347,307 B2 | 3/2008 | Joly |
| 7,374,028 B2 | 5/2008 | Fox |
| 7,389,994 B2 | 6/2008 | Trudeau et al. |
| 7,413,062 B2 | 8/2008 | Vandewal |
| 7,416,189 B2 | 8/2008 | Wilde et al. |
| 7,475,538 B2 | 1/2009 | Bishop |
| 7,493,995 B2 | 2/2009 | Sas et al. |
| 7,604,101 B2 | 10/2009 | Park |
| 7,611,000 B2 | 11/2009 | Naito |
| 7,621,538 B2 | 11/2009 | Nordmeyer et al. |
| 7,628,253 B2 | 12/2009 | Jin et al. |

(56) References Cited

U.S. PATENT DOCUMENTS

| | | |
|---|---|---|
| 7,644,933 B2 | 1/2010 | Brookes et al. |
| 7,654,369 B2 | 2/2010 | Murray et al. |
| 7,654,370 B2 | 2/2010 | Cubalchini, Jr. |
| 7,680,573 B2 | 3/2010 | Ogawa |
| 7,722,405 B2 | 5/2010 | Jaklin et al. |
| 7,743,896 B2 | 6/2010 | Vanhees et al. |
| 7,770,983 B2 | 8/2010 | Park |
| 7,775,333 B2 | 8/2010 | Or et al. |
| 7,849,983 B2 | 12/2010 | St. Clair et al. |
| 7,878,311 B2 | 2/2011 | Van Weelden et al. |
| 7,896,311 B2 | 3/2011 | Jee |
| 7,912,603 B2 | 3/2011 | Stiller et al. |
| 7,926,513 B2 | 4/2011 | Ishibashi et al. |
| 7,931,282 B2 | 4/2011 | Kolp et al. |
| 7,942,248 B2 | 5/2011 | St. Clair et al. |
| 7,946,163 B2 | 5/2011 | Gartner |
| 7,946,399 B2 | 5/2011 | Masamura |
| 7,967,116 B2 | 6/2011 | Boerschig |
| 7,967,117 B2 | 6/2011 | Abe |
| 7,992,692 B2 | 8/2011 | Lee et al. |
| 7,997,394 B2 | 8/2011 | Yamaguchi |
| 8,056,392 B2 | 11/2011 | Ryan et al. |
| 8,075,002 B1 | 12/2011 | Pionke et al. |
| 8,113,521 B2 | 2/2012 | Lin et al. |
| 8,116,939 B2 | 2/2012 | Kajino et al. |
| 8,132,654 B2 | 3/2012 | Widla et al. |
| 8,136,644 B2 | 3/2012 | Sonsterod |
| 8,160,774 B2 | 4/2012 | Li et al. |
| 8,214,106 B2 | 7/2012 | Ghoneim et al. |
| 8,267,382 B2 | 9/2012 | Yazaki et al. |
| 8,275,515 B2 | 9/2012 | Wright et al. |
| 8,317,172 B2 | 11/2012 | Quinn et al. |
| 8,393,446 B2 | 3/2013 | Haugen |
| 8,430,217 B2 | 4/2013 | Hennecke et al. |
| 8,525,453 B2 | 9/2013 | Ogawa |
| 8,567,575 B2 | 10/2013 | Jung et al. |
| 8,616,351 B2 | 12/2013 | Roessle et al. |
| 8,666,596 B2 | 3/2014 | Arenz |
| 8,684,367 B2 | 4/2014 | Haugen |
| 8,695,766 B2 | 4/2014 | Yamashita et al. |
| 8,794,405 B2 | 8/2014 | Yamashita et al. |
| 8,844,687 B2 | 9/2014 | Yu et al. |
| 8,899,391 B2 | 12/2014 | Yamasaki et al. |
| 8,948,941 B2 | 2/2015 | Ogawa |
| 9,027,937 B2 | 5/2015 | Ryan et al. |
| 9,150,077 B2 | 10/2015 | Roessle et al. |
| 9,163,691 B2 | 10/2015 | Roessle et al. |
| 9,188,186 B2 | 11/2015 | Hoven et al. |
| 9,217,483 B2 | 12/2015 | Dunaway et al. |
| 9,399,383 B2 | 7/2016 | Blankenship et al. |
| 9,404,551 B2 | 8/2016 | Roessle et al. |
| 9,695,900 B2 | 7/2017 | Roessle et al. |
| 2002/0133277 A1 | 9/2002 | Koh |
| 2003/0164193 A1 | 9/2003 | Lou |
| 2003/0192755 A1 | 10/2003 | Barbison et al. |
| 2004/0090020 A1 | 5/2004 | Braswell |
| 2004/0154887 A1 | 8/2004 | Nehl et al. |
| 2004/0199313 A1 | 10/2004 | Dellinger |
| 2005/0001472 A1 | 1/2005 | Bale et al. |
| 2005/0029063 A1 | 2/2005 | Neumann |
| 2005/0056502 A1 | 3/2005 | Maes |
| 2005/0056504 A1 | 3/2005 | Holiviers |
| 2005/0061593 A1 | 3/2005 | DeGronckel et al. |
| 2005/0085969 A1 | 4/2005 | Kim |
| 2005/0113997 A1 | 5/2005 | Kim |
| 2005/0173849 A1 | 8/2005 | Vandewal |
| 2006/0038149 A1 | 2/2006 | Albert et al. |
| 2006/0124415 A1 | 6/2006 | Joly |
| 2006/0219503 A1 | 10/2006 | Kim |
| 2007/0034466 A1 | 2/2007 | Paesmans et al. |
| 2007/0051574 A1 | 3/2007 | Keil et al. |
| 2007/0255466 A1 | 11/2007 | Chiao |
| 2008/0054537 A1 | 3/2008 | Harrison |
| 2008/0243336 A1 | 10/2008 | Fitzgibbons |
| 2008/0250844 A1 | 10/2008 | Gartner |
| 2008/0264743 A1 | 10/2008 | Lee et al. |
| 2008/0277218 A1 | 11/2008 | Fox |
| 2009/0071772 A1 | 3/2009 | Cho et al. |
| 2009/0078517 A1 | 3/2009 | Maneyama et al. |
| 2009/0084647 A1 | 4/2009 | Maneyama et al. |
| 2009/0132122 A1 | 5/2009 | Kim et al. |
| 2009/0192673 A1 | 7/2009 | Song et al. |
| 2009/0200125 A1 | 8/2009 | Sonsterod |
| 2009/0200503 A1 | 8/2009 | Park |
| 2010/0001217 A1 | 1/2010 | Jee et al. |
| 2010/0044172 A1 | 2/2010 | Jee et al. |
| 2010/0066051 A1 | 3/2010 | Haugen |
| 2010/0109276 A1* | 5/2010 | Marjoram ............ B60G 99/002 280/124.157 |
| 2010/0138116 A1 | 6/2010 | Coombs |
| 2010/0163354 A1 | 7/2010 | Braun |
| 2010/0181154 A1 | 7/2010 | Panichgasem |
| 2010/0191420 A1 | 7/2010 | Honma et al. |
| 2010/0211253 A1 | 8/2010 | Morais Dos Santos et al. |
| 2010/0276906 A1 | 11/2010 | Galasso et al. |
| 2010/0301578 A1 | 12/2010 | Noda et al. |
| 2010/0326267 A1 | 12/2010 | Hata |
| 2011/0035091 A1 | 2/2011 | Yamamoto |
| 2011/0056780 A1 | 3/2011 | St.Clair et al. |
| 2011/0056783 A1 | 3/2011 | Teraoka et al. |
| 2011/0079475 A1* | 4/2011 | Roessle ................ F16F 9/348 188/266.5 |
| 2011/0101579 A1 | 5/2011 | Polakowski et al. |
| 2011/0153157 A1 | 6/2011 | Klank et al. |
| 2011/0198172 A1 | 8/2011 | Whan |
| 2011/0214956 A1 | 9/2011 | Marking |
| 2011/0240424 A1 | 10/2011 | Beck |
| 2011/0298399 A1 | 12/2011 | Ogawa et al. |
| 2012/0018263 A1 | 1/2012 | Marking |
| 2012/0048665 A1 | 3/2012 | Marking |
| 2012/0073918 A1 | 3/2012 | Nishimura et al. |
| 2012/0073920 A1 | 3/2012 | Yamasaki et al. |
| 2012/0181126 A1 | 7/2012 | De Kock |
| 2012/0186922 A1 | 7/2012 | Battlogg et al. |
| 2012/0228072 A1 | 9/2012 | Mangelschots et al. |
| 2012/0305349 A1 | 12/2012 | Murakami et al. |
| 2013/0081913 A1 | 4/2013 | Nowaczyk et al. |
| 2013/0090808 A1 | 4/2013 | Lemme et al. |
| 2013/0228401 A1 | 9/2013 | Bender et al. |
| 2013/0234379 A1 | 9/2013 | Panichgasem |
| 2013/0263943 A1 | 10/2013 | Forster |
| 2013/0275003 A1 | 10/2013 | Uchino et al. |
| 2013/0299291 A1 | 11/2013 | Ewers et al. |
| 2013/0313057 A1 | 11/2013 | Tsukahara et al. |
| 2013/0328277 A1 | 12/2013 | Ryan et al. |
| 2013/0340865 A1 | 12/2013 | Manger et al. |
| 2013/0341140 A1 | 12/2013 | Nakajima |
| 2013/0341842 A1 | 12/2013 | Weber |
| 2013/0345933 A1 | 12/2013 | Norton et al. |
| 2014/0102842 A1 | 4/2014 | Roessle et al. |
| 2014/0125018 A1 | 5/2014 | Brady et al. |
| 2014/0202808 A1 | 7/2014 | Spyche, Jr. et al. |
| 2014/0216871 A1 | 8/2014 | Shibahara |
| 2014/0231200 A1 | 8/2014 | Katayama |
| 2014/0238797 A1 | 8/2014 | Blankenship et al. |
| 2014/0239602 A1 | 8/2014 | Blankenship et al. |
| 2014/0244112 A1 | 8/2014 | Dunaway et al. |
| 2014/0260233 A1 | 9/2014 | Giovanardi et al. |
| 2014/0262648 A1 | 9/2014 | Roessle et al. |
| 2014/0262652 A1 | 9/2014 | Roessle et al. |
| 2014/0262654 A1 | 9/2014 | Roessle et al. |
| 2014/0265169 A1 | 9/2014 | Giovanardi et al. |
| 2014/0265170 A1 | 9/2014 | Giovanardi et al. |
| 2014/0284156 A1 | 9/2014 | Kim |
| 2014/0291090 A1 | 10/2014 | Shimasaki |
| 2014/0297116 A1 | 10/2014 | Anderson et al. |
| 2014/0297117 A1 | 10/2014 | Near et al. |
| 2014/0303844 A1 | 10/2014 | Hoffmann et al. |
| 2015/0088379 A1 | 3/2015 | Hirao |

FOREIGN PATENT DOCUMENTS

| | | |
|---|---|---|
| CN | 101025213 A | 8/2007 |
| CN | 100381728 C | 4/2008 |

(56) References Cited

FOREIGN PATENT DOCUMENTS

| | | |
|---|---|---|
| CN | 101229765 A | 7/2008 |
| CN | 101509535 A | 8/2009 |
| CN | 201575099 U | 9/2010 |
| CN | 201575100 U | 9/2010 |
| CN | 101857035 A | 10/2010 |
| CN | 201636258 U | 11/2010 |
| CN | 201705852 U | 1/2011 |
| CN | 102032306 A | 4/2011 |
| CN | 102076988 A | 5/2011 |
| CN | 102109024 A | 6/2011 |
| CN | 102345700 A | 2/2012 |
| CN | 103154562 A | 6/2013 |
| CN | 103168183 A | 6/2013 |
| CN | 103244495 A | 8/2013 |
| CN | 203186023 U | 9/2013 |
| CN | 103429929 A | 12/2013 |
| CN | 103702888 A | 4/2014 |
| CN | 203548687 U | 4/2014 |
| CN | 103946095 A | 7/2014 |
| CN | 104074909 A | 10/2014 |
| DE | 3406875 A1 | 9/1985 |
| DE | 3518858 A1 | 11/1985 |
| DE | 3432465 A1 | 3/1986 |
| DE | 3518327 A1 | 11/1986 |
| DE | 3928343 A1 | 2/1991 |
| DE | 4041619 A1 | 6/1992 |
| DE | 19853277 C1 | 5/2000 |
| DE | 10025399 A1 | 12/2000 |
| DE | 10238657 A1 | 3/2004 |
| DE | 112007002377 T5 | 8/2009 |
| EP | 1588072 A1 | 10/2005 |
| EP | 1746302 A1 | 1/2007 |
| EP | 2105330 A1 | 9/2009 |
| GB | 2123922 A | 2/1984 |
| GB | 2154700 A | 9/1985 |
| JP | S58211042 A | 12/1983 |
| JP | S60138044 U | 9/1985 |
| JP | 61125907 | 6/1986 |
| JP | S61266842 | 11/1986 |
| JP | 62-253506 | 11/1987 |
| JP | S6467408 A | 3/1989 |
| JP | H0550827 A | 3/1993 |
| JP | 06-026546 | 2/1994 |
| JP | 07-113434 | 5/1995 |
| JP | 7056311 | 6/1995 |
| JP | H0899514 A | 4/1996 |
| JP | 08-260747 | 10/1996 |
| JP | 09-217779 | 8/1997 |
| JP | 200267650 A | 3/2002 |
| JP | 2002-349630 A | 12/2002 |
| JP | 2008106783 A | 5/2008 |
| JP | 2009002360 A | 1/2009 |
| JP | 201198683 A | 5/2011 |
| JP | 2011236937 A | 11/2011 |
| WO | 9218788 A1 | 10/1992 |
| WO | 2010029133 A1 | 3/2010 |

OTHER PUBLICATIONS

Office Action from German Patent Office for corresponding German Application No. 11 2010 003 954.2 dated Dec. 9, 2015, 19 pages.
Search Report and Written Opinion dated Jun. 20, 2014 in corresponding PCT Application No. PCT/US2014/019534 (12pp).
Chinese Office Action for corresponding Chinese Patent Application No. 201410208616.8 dated Apr. 15, 2016, 15 pages.
Search Report and Written Opinion dated Jun. 19, 2014 in corresponding PCT Application No. PCT/US2014/019400 (12 pages).
Search Report and Written Opinion dated Aug. 19, 2014 in corresponding PCT Application No. PCT/US2014/028136 (12 pages).

* cited by examiner

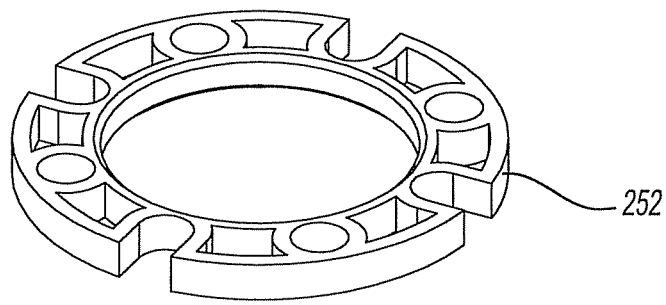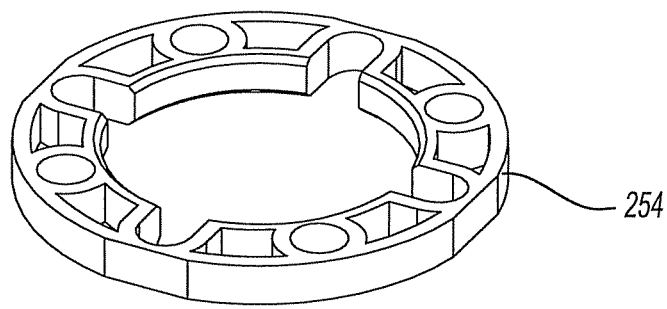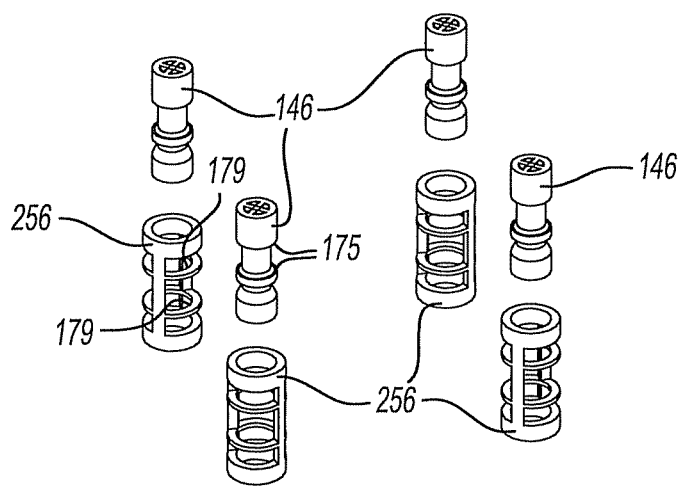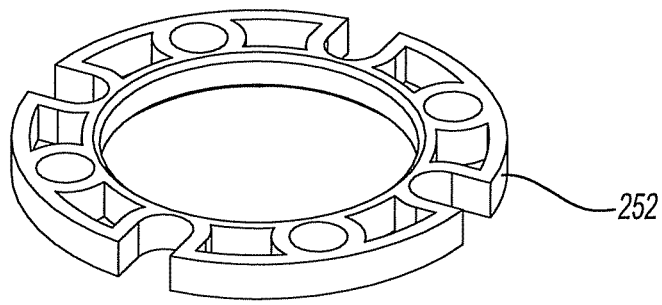
Fig-13B

ROD GUIDE SYSTEM AND METHOD WITH MULTIPLE SOLENOID VALVE CARTRIDGES AND MULTIPLE PRESSURE REGULATED VALVE ASSEMBLIES

CROSS-REFERENCE TO RELATED APPLICATIONS

This application claims the benefit of U.S. Provisional Application No. 62/011,736, filed on Jun. 13, 2014, and is also a continuation-in-part of U.S. Non-provisional application Ser. No. 14/211,318, filed Mar. 14, 2014, which in turn claims priority from U.S. Provisional Application Nos. 61/787,004, filed Mar. 15, 2013, and 61/787,169, filed Mar. 15, 2013. The entire disclosures of the above-referenced applications are incorporated herein by reference.

FIELD

The present disclosure relates generally to hydraulic dampers or shock absorbers for use in a suspension system such as a suspension system used for automotive vehicles. More particularly, the present disclosure relates to a rod guide assembly for a shock absorber which employs a plurality of digital valves each having an additional valve assembly at its outlet side for further controlling the damping characteristics of the shock absorber.

BACKGROUND

This section provides background information related to the present disclosure which is not necessarily prior art.

Shock absorbers are used in conjunction with automotive suspension systems to absorb unwanted vibrations that occur during driving. To absorb the unwanted vibrations, shock absorbers are generally connected between the sprung portion (body) and the unsprung portion (suspension) of the automobile. A piston is located within a pressure tube of the shock absorber and the pressure tube is connected to the unsprung portion of the vehicle. The piston is connected to the sprung portion of the automobile through a piston rod that extends through the pressure tube. The piston divides the pressure tube into an upper working chamber and a lower working chamber both of which are filled with hydraulic fluid. Through valving, the piston is able to limit the flow of the hydraulic fluid between the upper and the lower working chambers when the shock absorber is compressed or extended, to thereby produce a damping force which counteracts the vibration which would otherwise be transmitted from the unsprung portion to the sprung portion of the vehicle. In a dual-tube shock absorber, a fluid reservoir or reserve chamber is defined between the pressure tube and a reserve tube. A base valve is located between the lower working chamber and the reserve chamber to also produce a damping force which counteracts the vibrations which would otherwise be transmitted from the unsprung portion of the vehicle to the sprung portion of the automobile.

As described above, for a dual-tube shock absorber, the valving on the piston limits the flow of damping fluid between the upper and lower working chambers when the shock absorber is extended to produce a damping load. The valving on the base valve limits the flow of damping fluid between the lower working chamber and the reserve chamber when the shock absorber is compressed to produce a damping load. In a mono-tube shock absorber, the valving on the piston limits the flow of damping fluid between the upper and lower working chambers when the shock absorber is extended or compressed to produce a damping load. As the vehicle travels along the road surface, the suspension system moves in jounce (compression) and rebound (extension). During jounce movements, the shock absorber is compressed causing damping fluid to move through the base valve in a dual-tube shock absorber or through the piston valve in a mono-tube shock absorber. A damping valve located on the base valve or the piston controls the flow of damping fluid and thus the damping force created. During rebound movements, the shock absorber is extended, causing damping fluid to move through the piston in both the dual-tube shock absorber and the mono-tube shock absorber. A damping valve located on the piston controls the flow of damping fluid and thus the damping force created.

In a dual-tube shock absorber, the piston and the base valve normally include a plurality of compression passages and a plurality of extension passages. During jounce or compression movements in a dual-tube shock absorber, the damping valve or the base valve opens the compression passages in the base valve to control fluid flow and produce a damping load. A check valve on the piston opens the compression passages in the piston to replace damping fluid in the upper working chamber but this check valve does not contribute to the damping load. The damping valve on the piston closes the extension passages of the piston and a check valve on the base valve closes the extension passages of the base valve during a compression movement. During rebound or extension movements in a dual-tube shock absorber, the damping valve on the piston opens the extension passages in the piston to control fluid flow and produce a damping load. A check valve on the base valve opens the extension passages in the base valve to replace damping fluid in the lower working chamber but this check valve does not contribute to the damping load.

In a mono-tube shock absorber, the piston normally includes a plurality of compression passages and a plurality of extension passages. The shock absorber will also include means for compensating for the rod volume flow of fluid as is well known in the art. During jounce or compression movements in a mono-tube shock absorber, the compression damping valve on the piston opens the compression passages in the piston to control fluid flow and produce a damping load. The extension damping valve on the piston closes the extension passages of the piston during a jounce movement. During rebound or extension movements in a mono-tube shock absorber, the extension damping valve on the piston opens the extension passages in the piston to control fluid flow and produce a damping load. The compression damping valve on the piston closes the compression passages of the piston during a rebound movement.

For most dampers, the damping valves are designed as a normal open/close valve even though some valves may include a bleed flow of damping fluid. Because of this open/close design, these passive valve systems are limited in their ability to adjust the generated damping load in response to various operating conditions of the vehicle. Accordingly, some valves have been designed to include a bleed flow of damping fluid, such as in Applicant/Assignee's commonly owned U.S. Pat. No. 8,616,351. While this type of design works effectively, it requires high precision components that are manufactured with tight tolerances.

Various solutions to the above limitations are presented in co-pending application U.S. application Ser. No. 14/211,318 to Roessle et al., filed Mar. 14, 2014, and assigned to the assignee of the present application. This application discloses various embodiments of dampers that make use of a plurality of electrically energizable coils and associated spool valves disposed in the rod guide to further control the damping characteristics of a damper. The coils may be energized independently of one another, to thus control opening and close of the spool valves independently of one another. The coils and spool valves may be viewed as together forming a "digital" valve. By "digital", it is meant that the spool valve is either fully open or fully closed depending on whether its associated coil is energized or deenergized. In the open state, each spool valve forms an additional passage for flow between a pressure tube and a reserve tube. A system employing four such digital valves a rod guide assembly would thus be able to provide $2^4$ or 16 different damping states. This provides a means of enabling even further control over the damping characteristics of the damper, beyond what is achievable using just the valving associated with the piston and the base valve of the damper.

While the above integration of a plurality of digital valves into a rod guide assembly significantly enhances the ability to more finely control the damping characteristics of a damper, even further damping control over a multi-digital valve system would be beneficial.

SUMMARY

This section provides a general summary of the disclosure, and is not a comprehensive disclosure of its full scope or all of its features.

In one aspect the present disclosure provides for a shock absorber. The shock absorber has a pressure tube forming a pressure chamber. A piston rod is disposed within the pressure chamber. A reserve tube defines a reserve chamber adjacent the pressure tube. A rod guide assembly is concentrically disposed about the piston rod and the pressure chamber and houses a plurality of digital valves. Each one of the digital valves includes a component which is moveable between an open state and a closed state, and thus helps to control a fluid flow between the pressure chamber and the reserve chamber. An electronic control system is disposed on a printed circuit board assembly (PCBA) and controls actuation of the digital valves. At least one additional valve is associated with one of the digital valves for further controlling a flow of fluid between the pressure chamber and the reserve chamber.

In another aspect the present disclosure provides for a shock absorber having a pressure tube and a pressure chamber. A piston rod is disposed within the pressure chamber and a reserve tube defines a reserve chamber circumscribing the pressure tube. A rod guide assembly is concentrically disposed about the piston rod and the pressure chamber. The rod guide assembly includes a plurality of recesses formed therein, with each of the recesses being in communication with an associated one of a plurality of radially extending inlet ports. An orifice tube having a plurality of holes is arranged concentrically with the rod guide assembly such that each one of the plurality of holes registers with an associated one of the radially extending inlet ports. Digital valves are disposed in the recesses of the rod guide assembly, with each one of the digital valves including a component which is moveable between an open state and a closed state. Each one of the digital valves thus operates to either block fluid flow through its associated radially extending inlet port, or to permit fluid flow through its associated radially extending inlet port to an associated outlet port, to thus control a fluid flow between the pressure chamber and the reserve chamber. An electronic control system, disposed on a printed circuit board assembly (PCBA), is used for controlling actuation of the digital valves. A plurality of additional valves is included, with each one of the additional valves being associated with a respective one of the digital valves, for further controlling a flow of fluid through its associated digital valve.

In still another aspect the present disclosure relates to a method of forming a shock absorber. The method involves using a pressure tube to form a pressure chamber and disposing a piston rod within the pressure chamber. The method further involves using a reserve tube to define a reserve chamber adjacent the pressure tube, and disposing a rod guide assembly concentrically about the piston rod and the pressure chamber. The method also involves using a plurality of digital valves disposed in the rod guide assembly to control fluid flow between the pressure chamber and the reserve chamber. An electronic control system may also be used which is disposed on a printed circuit board assembly (PCBA) to control actuation of the digital valves. The method further involves using at least one additional valve which is associated with one of the digital valves for further controlling a flow of fluid between the pressure chamber and the reserve chamber.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 13A and 13B illustrate a valve flow guide having multiple rings and a metering sleeve;

Figure 28:
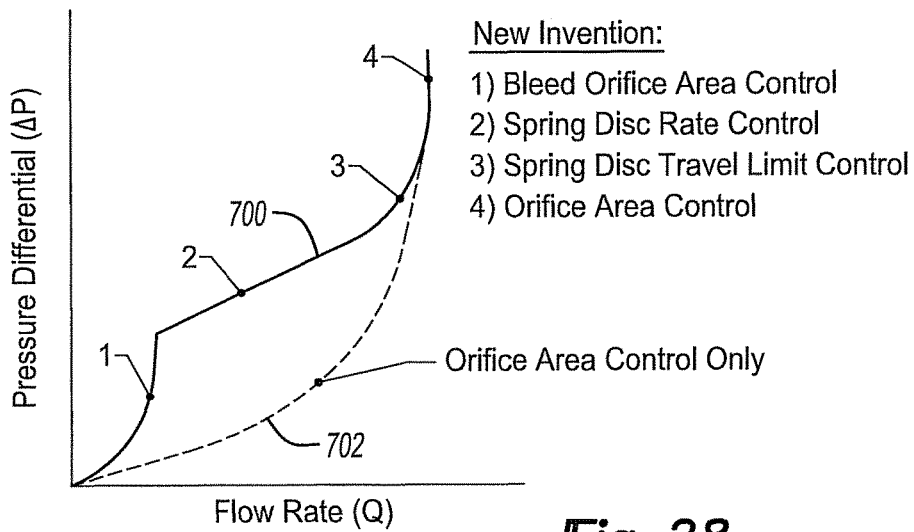
Figure 29:
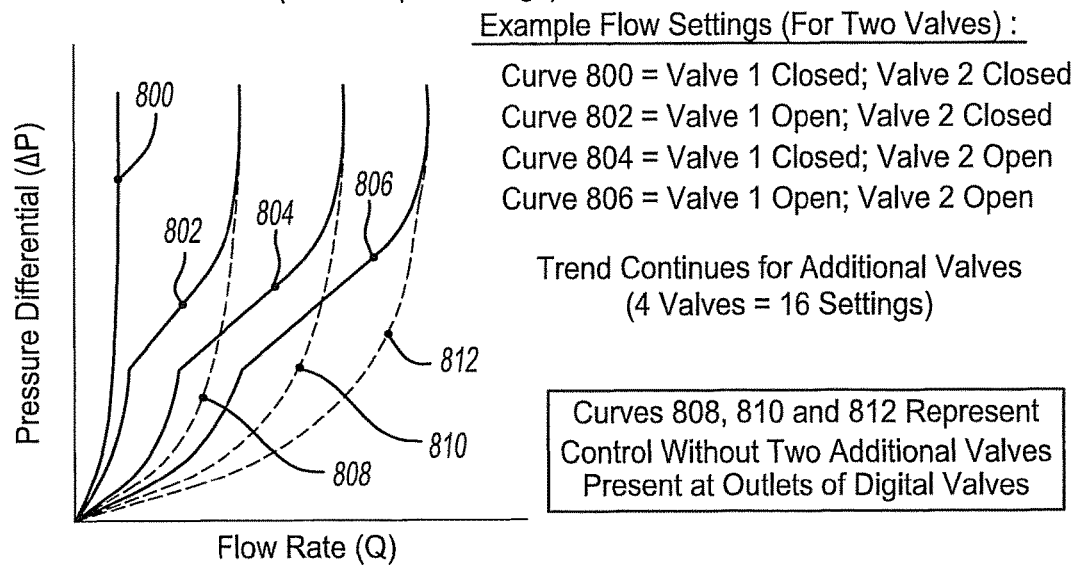

FIG. 28 is a graph of flow rate versus pressure differential for flow between the pressure tube and the reserve tube, and illustrating the various flow points at which the valve structure at the outlet of the solenoid valve cartridge, or the outlet of the coil and spool valve, may be used to influence the pressure differential of fluid flow between the pressure tube and the reserve tube; and FIG. 29 is a graph of flow rate versus pressure differential and illustrating the effect that the use of a plurality of two additional valve structures at the outlet side of the solenoid valve cartridge or digital valve has on the pressure differential of fluid flow between the pressure tube and the reserve tube.

Corresponding reference numerals indicate corresponding parts throughout the several views of the drawings.

DETAILED DESCRIPTION

Figure 1:
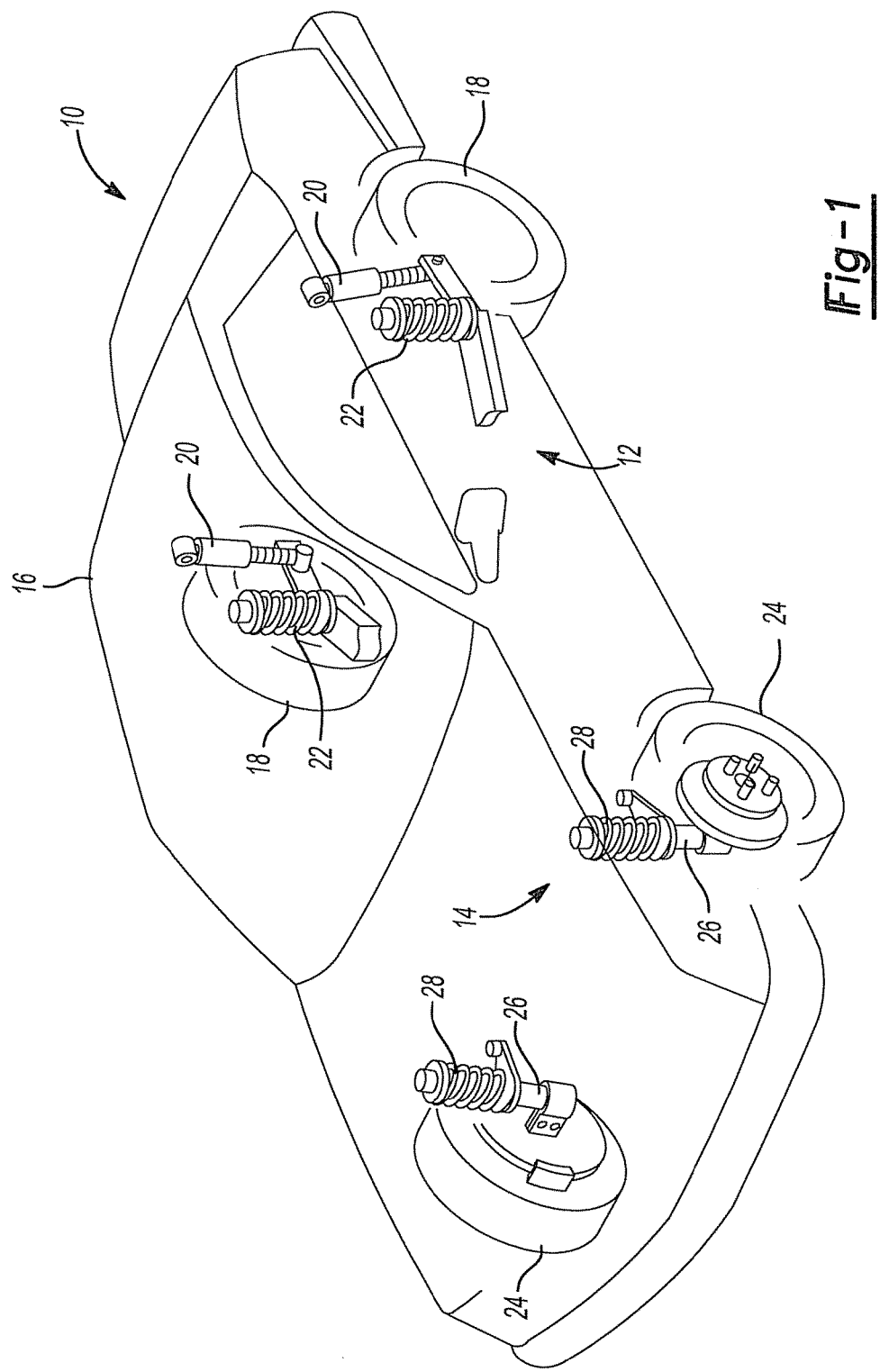
FIG. 1 is an illustration of a vehicle having shock absorbers which incorporate a rod guide assembly in accordance with the present disclosure.

The following description is merely exemplary in nature and is not intended to limit the present disclosure, application, or uses. With reference to FIG. 1, a vehicle 10 incorporating a suspension system having shock absorbers in accordance with the present invention is presented. The vehicle 10 has been depicted as a passenger car having front and rear axle assemblies. However, shock absorbers in accordance with the present invention may be used with other types of vehicles or in other types of applications. Examples of these alternate arrangements include, but are not limited to, vehicles incorporating non-independent front and/or non-independent rear suspensions, vehicles incorporating independent front and/or independent rear suspensions or other suspension systems known in the art. Further, the term "shock absorber" as used herein is meant to refer to dampers in general and thus will include McPherson struts and other damper designs known in the art.

The vehicle 10 includes a rear suspension 12, a front suspension 14, and a body 16. The rear suspension 12 has a transversely extending rear axle assembly (not shown) adapted to operatively support a pair of rear wheels 18. The rear axle is attached to the body 16 by means of a pair of shock absorbers 20 and by a pair of springs 22. Similarly, the front suspension 14 includes a transversely extending front axle assembly (not shown) for operatively supporting a pair of front wheels 24. The front axle assembly is attached to the body 16 by means of a pair of shock absorbers 26 and by a pair of springs 28. Shock absorbers 20, 26 serve to dampen the relative motion of the unsprung portion (i.e., rear and front suspensions 12, 14) with respect to the sprung portion (i.e., body 16) of vehicle 10.

Figure 2:
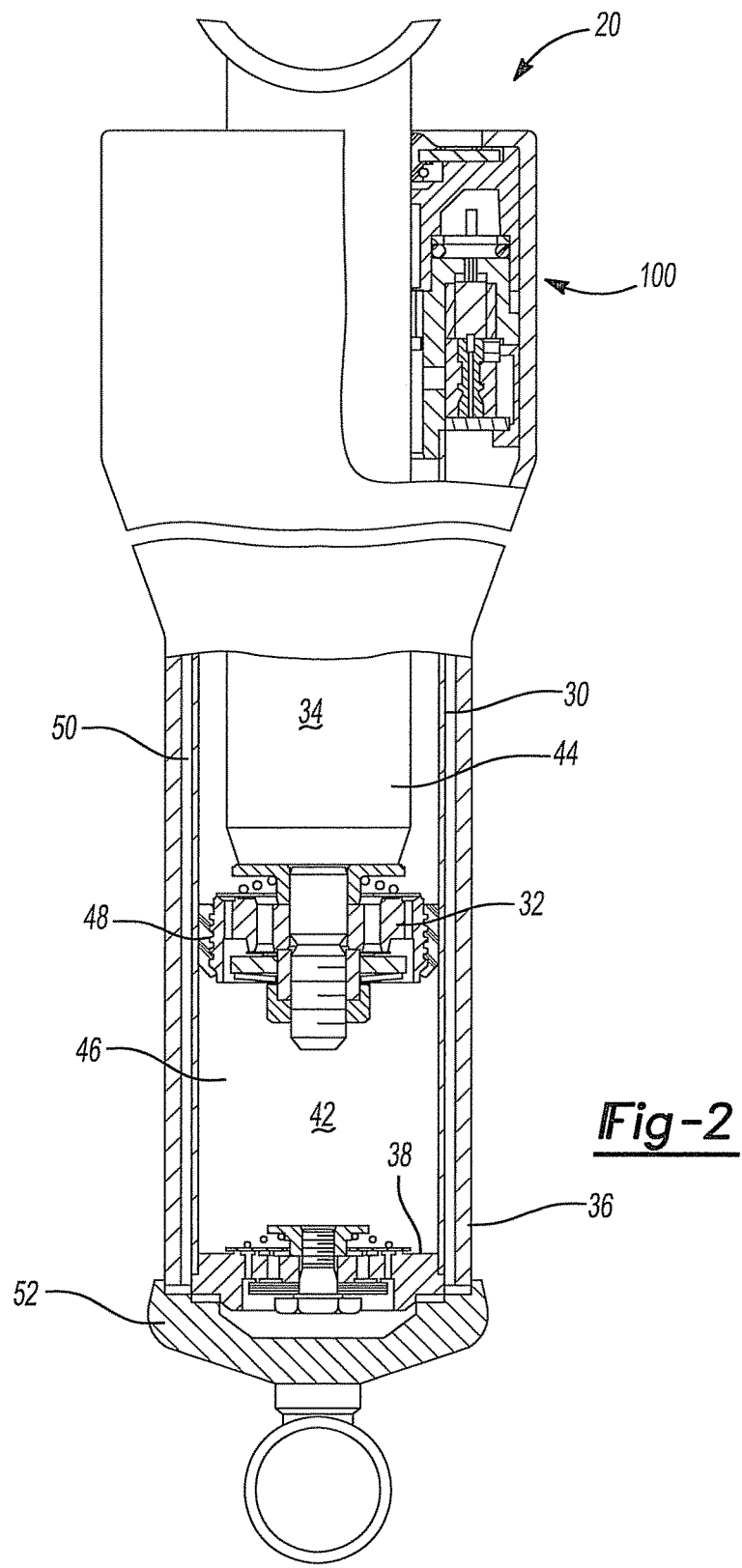
FIG. 2 is partial-cross-sectional view of a shock absorber.

Referring now to FIG. 2, the shock absorber 20 is shown in greater detail. While FIG. 2 illustrates only shock absorber 20, it is to be understood that shock absorber 26 is substantially similar to shock absorber 20. Shock absorber 26 differs from shock absorber 20 only in the manner in which it is adapted to be connected to the sprung and unsprung masses of the vehicle 10. The shock absorber 20 comprises a pressure tube 30, a piston assembly 32, a piston rod 34, a reserve tube 36, a base valve assembly 38, and a rod guide assembly 100.

The pressure tube 30 defines a working chamber 42. The piston assembly 32 is slidably disposed within the pressure tube 30 and divides the working chamber 42 into an upper working chamber 44 and a lower working chamber 46. A seal 48 is disposed between the piston assembly 32 and the pressure tube 30 to permit sliding movement of the piston assembly 32 with respect to the pressure tube 30 without generating undue frictional forces. The seal 48 also works to seal the upper working chamber 44 from the lower working chamber 46.

The piston rod 34 is attached to the piston assembly 32 and extends through the upper working chamber 44 and through the rod guide assembly 100. The end of the piston rod 34 opposite to the piston assembly 32 is adapted to be secured to the sprung mass of the vehicle 10. Valving within the piston assembly 32 controls the movement of fluid between the upper working chamber 44 and the lower working chamber 46 during movement of the piston assembly 32 within the pressure tube 30. Movement of the piston assembly 32 with respect to the pressure tube 30 causes a difference in the amount of fluid displaced in the upper working chamber 44 and the amount of fluid displaced in the lower working chamber 46. This is primarily because the piston rod 34 extends only through the upper working chamber 44 and not through the lower working chamber 46. The difference in the amount of fluid displaced which flows through the base valve assembly 38 is known as the "rod volume".

The reserve tube 36 surrounds the pressure tube 30 to define a fluid reservoir chamber 50 located between tubes 30, 36. The bottom end of the reserve tube 36 is closed by a base cup 52 which is adapted to be connected to the unsprung mass of the vehicle 10. The upper end of the reserve tube 36 may extend to the rod guide assembly 100.

The base valve assembly 38 is disposed between the lower working chamber 46 and the reservoir chamber 50 to control the flow of fluid between chambers 46, 50. When the shock absorber 20 extends in length, an additional volume of fluid is needed in the lower working chamber 46. Thus, fluid will flow from the reservoir chamber 50 to the lower working chamber 46 through the base valve assembly 38.

Conversely, when the shock absorber 20 compresses in length (i.e., when the piston rod 34 moves toward the base valve assembly 38), an excess of fluid must be removed from the lower working chamber 46. Thus, fluid will flow from the lower working chamber 46 to the reservoir chamber 50 through the base valve assembly 38.

With reference to FIGS. 3-9, an example of the rod guide assembly 100 is now presented. The rod guide assembly 100 is disposed within the reserve tube 36. A load ring 54 secures the rod guide assembly 100 within the reserve tube 36. The rod guide assembly 100 includes a seal 102, an upper rod guide 104 (i.e., a first rod guide member), a lower rod guide 106 (i.e., a second rod guide member), a valve assembly 108, and printed circuit board (PCB) assembly 112. The valve assembly 108 forms one or more electronically controlled valves 114.

The seal 102 is disposed at an outer surface of the upper rod guide 104. The upper rod guide 104 may have a substantially cylindrical shaped body with a central shaft 116 that defines a central aperture 118. The upper rod guide 104 defines a seal cavity 117 which is concentrically arranged about the central aperture 118 for accommodating the seal 102. An outer wall 120 of the upper rod guide 104 defines a slot 122 which accommodates a wire assembly 123. The upper rod guide 104 may be made of metal.

A bearing 124 is disposed within the central shaft 116 of the upper rod guide 104. More particularly, the bearing 124 may be pressed-fit within the central shaft 116 about the central aperture 118. The bearing 124 supports the sliding motion of the piston rod 34.

Figure 6:
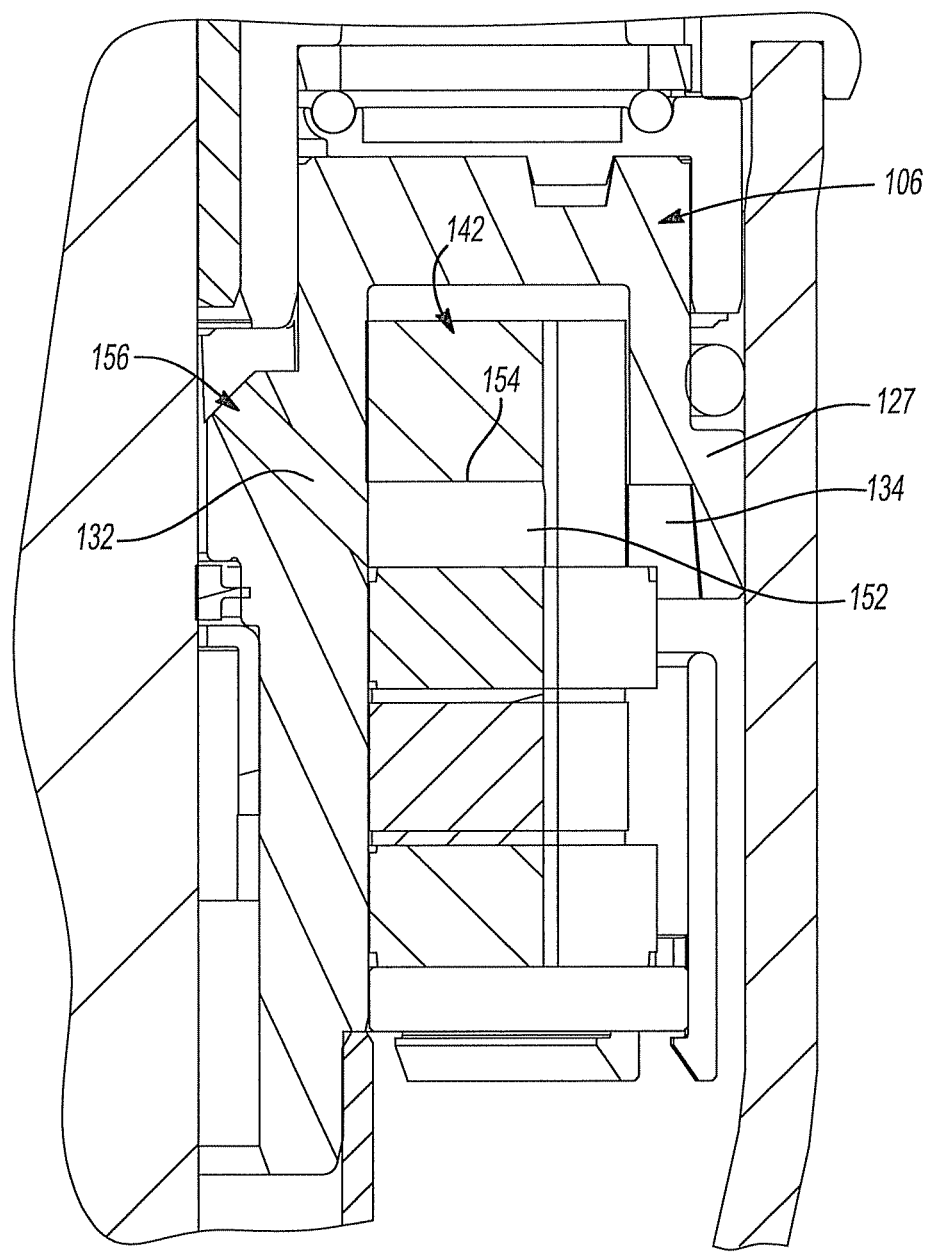
FIG. 6 is an enlarged cross-sectional view of a drain passage of the rod guide assembly of FIG. 5.
Figure 7:
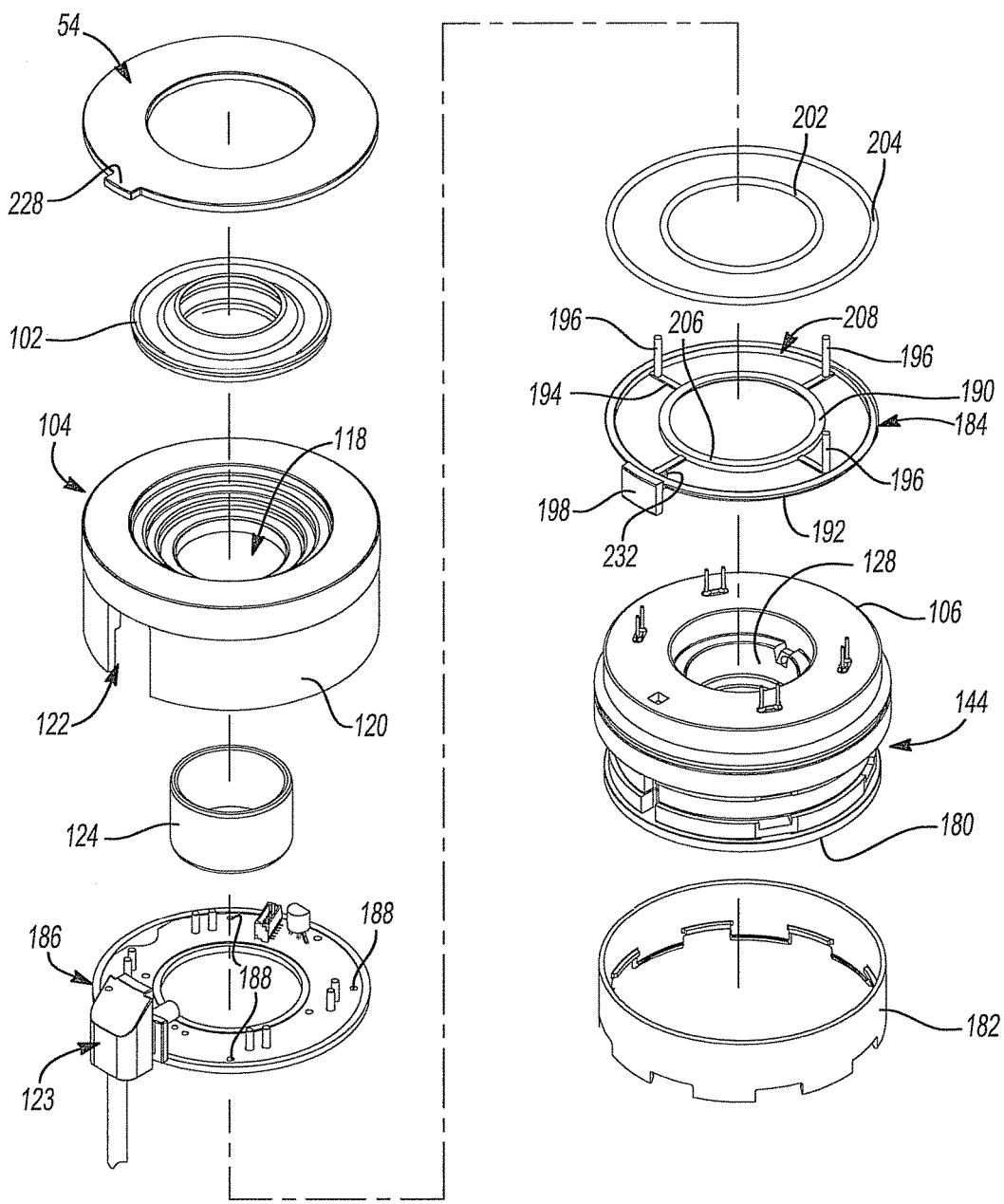
FIG. 7 is an exploded view of the rod guide assembly of FIG. 5.

The lower rod guide 106 may also have a substantially cylindrical shaped body with a central shaft 126 and an outer band 127 extending from the central shaft 126. The outer band 127 and the central shaft 126 define a space 129. The central shaft 126 defines a central aperture 128 which aligns with the central aperture 118 of the upper rod guide 104. The pressure tube 30 is fixedly coupled to the central shaft 126. The central shaft 126 defines a radial port 130. The number of radial ports 130 defined equals the number of electronically controlled valves 114 in the valve assembly 108. The lower rod guide 106 may also define one or more drainback ports 132 at the central shaft 126 and one or more drainback slots 134 defined at the outer band 127 (FIG. 6).

A slip ring 136 and an orifice tube 138 are disposed within the central shaft 126 of the lower rod guide 106. Specifically, the slip ring 136 and the orifice tube 138 may be pressed-fit within the central shaft 126. The orifice tube 138 defines a hole 140 which aligns with the radial port 130 of the lower rod guide 106. Similar to the radial port 130, the number of holes 140 equals the number of electronically controlled valves 114. The holes 140 and the radial ports 130 fluidly couple the electronically controlled valves 114 to the working chamber 42. The holes 140 control the fluid flow rate characteristics of the electronically controlled valves 114. The holes 140 may have different diameters, thereby providing different discrete flow areas. The orifice tube 138 may also have a shoulder or an integral lip which provides a retention feature for the slip ring 136. The orifice tube 138 may be made of metal.

In the example embodiment, the valve assembly 108 has four electronically controlled valves 114. The valve assembly 108 includes a coil assembly 142, a valve flow guide 144, and one or more spools 146. The coil assembly 142 includes one or more coils 148 which are aligned and coupled to each other via an annular body 150. More particularly, in the example embodiment, four coils 148 are individually wound and then aligned relative to one another. Once aligned, the coils 148 may then be molded with a polymer material which forms the annular body 150. A terminal 151 of the coils extend from the annular body 150.

The coil assembly 142 may also include one or more drainback slots 152 defined along a base 154 of the annular body 150. When assembled, the drainback slots 152 along the coil assembly 142 and the drainback ports 132 and the drain back slots 134 defined on the lower rod guide 106 align to form a drainback passage 156 (FIG. 6). The drainback passage 156 forms a flow path between a chamber formed between the seal 102 and the slip ring 136 to the reservoir chamber 50 of the shock absorber 20. Accordingly, the drainback passage 156 prevents hydraulic fluid from accumulating between the seal 102 and the slip ring 136.

The coil assembly 142 is arranged within the space 129 defined by the lower rod guide 106. More particularly, the terminal 151 of each of the coils 148 extends through a terminal slot 158 defined by the lower rod guide 106. An O-ring 160 may be disposed between the lower rod guide 106 and the annular body 150 for each terminal 151 of the coil assembly 142.

Figure 5:
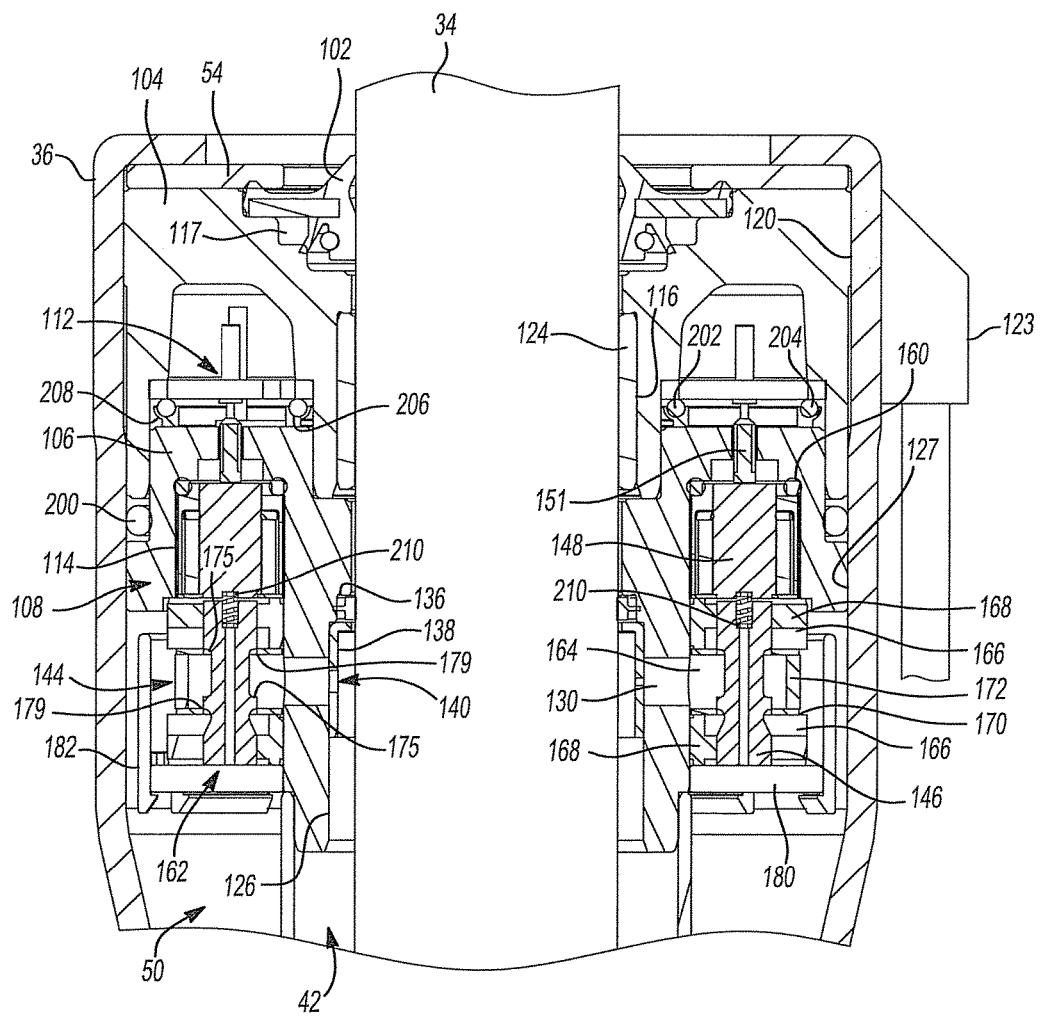
FIG. 5 is an enlarged cross-sectional view of a first example of a rod guide assembly for the shock absorber.
Figure 8:
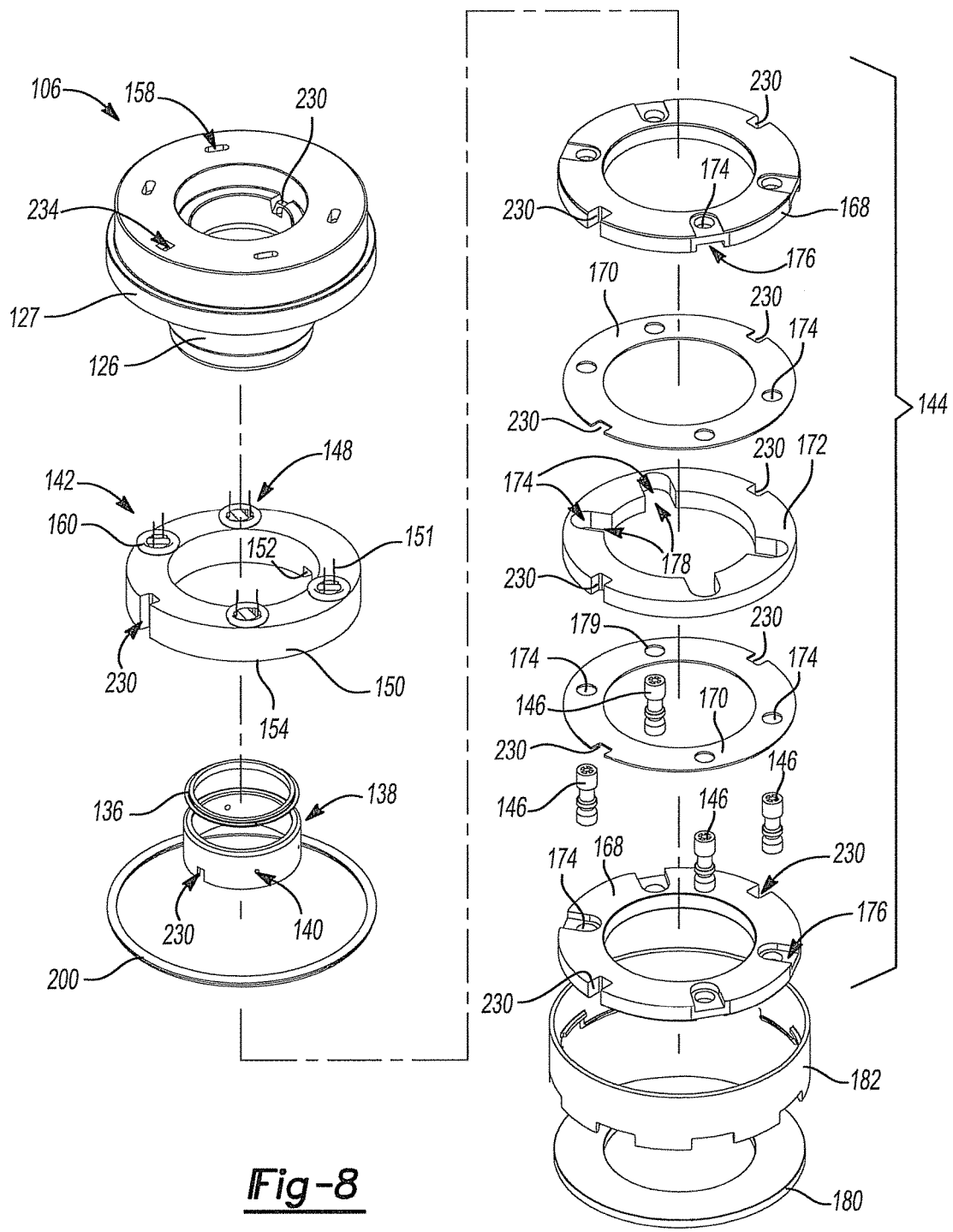
FIG. 8 is an exploded view of a lower rod guide and valve assembly of the rod guide assembly of FIG. 5.
Figure 9:
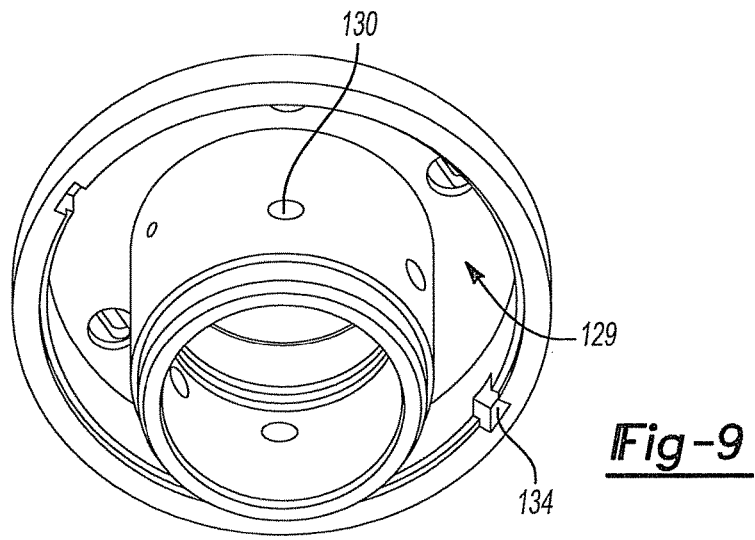
FIG. 9 is an enlarged view of the lower rod guide.

The valve flow guide 144 defines a spool chamber 162, a valve inlet 164, and valve outlet 166. More particularly, the valve flow guide 144 includes at least two valve outlet rings 168, at least two metering rings 170, and a valve inlet ring 172 (FIGS. 5 and 8). Each of the rings 168, 170, 172 defines a spool hole 174. The valve outlet rings 168 define an outlet port 176, and the valve inlet ring 172 defines an inlet port 178. The metering rings 170 have metering edges 179 that align with metering lands 175 of the spool 146 to control the fluid flow in the open/closed valve positions (FIG. 5). The rings 168, 170, 172 are stacked in the following order: one valve outlet ring 168, one metering ring 170, the valve inlet ring 172, one metering ring 170, and one valve outlet ring 168. When stacked, the spool holes 174 defined by each ring 168, 170, 172 align to form the spool chamber 162. Similarly, the inlet port 178 forms the valve inlet 164 and the outlet ports 176 form the valve outlet 166.

In the example embodiment, the metering rings 170 are separate from the valve outlet rings 168 and the valve inlet ring 172. Alternatively, the metering rings 170 may be integral with or coupled with the valve outlet ring 168 and/or the valve inlet ring 172. Specifically, the metering land 179 may be provided with the valve outlet rings 168 and/or the valve inlet rings 172. For example, one metering ring 170 may be fixed to one of the valve outlet rings 168 and the other metering ring 170 may be fixed to the valve inlet ring 172, such that the metering rings 170 are between the valve inlet ring 172 and the valve outlet rings 168.

By way of another example, both metering rings 170 may be fixed to the valve inlet rings 172, such that one metering ring 170 is disposed on a first side of the valve inlet ring 172 and the other ring 170 is disposed on a second side opposite the first side of the valve inlet ring 172. By having the metering rings 170 integral with the valve outlet rings 168 and/or valve inlet rings 172, the rings 168, 172 would be stacked in the following order: one valve outlet ring 168, the valve inlet ring 172, and the other valve outlet ring 168.

As another variation, in lieu of coupling the metering ring with the valve outlet ring and/or valve inlet ring, the valve outlet ring and/or the valve inlet ring may be configured to include a metering edge which aligns with a metering land of the spool. Thus, the valve flow guide may be a multiple piece assembly which forms the valve inlet, the valve outlets, and provides a metering edge for the spools.

The valve flow guide 144 defines the spool chamber 162, the valve inlet 164, and the valve outlet 166 for each of the electronically controlled valves 114 of the valve assembly 108. Accordingly, in the example embodiment, each of the rings 168, 170, 172 defines four spool holes 174, each of the valve outlet rings 168 define four outlet ports 176, and the valve inlet ring 172 defines four inlet ports 178.

The valve flow guide 144 and a stop plate 180 are arranged around the central shaft 126 of the lower rod guide 106. The stop plate 180 is positioned below the valve flow guide 144 and forms the bottom surface of the valve flow guide 144. The stop plate 180 further retains the spool 146, such that the spool 146 travels axially within the spool chamber 162 between the coil assembly 142 and the stop plate 180.

An outlet reservoir 182 is arranged around the central shaft 126 of the lower rod guide 106 and is retained to the lower rod guide 106 by the stop plate 180. The outlet reservoir 182 extends substantially up to and around the valve flow guide 144. Specifically, the outlet reservoir 182 may extend substantially to the valve outlet ring 168 closest to the coil assembly 142. The outlet reservoir 182 maintains a volume of hydraulic fluid around the valve flow guide 144. The level of fluid contained by the outlet reservoir 182 is above the valve outlet 166 of the electronically controlled valve 114, thereby ensuring that the valve outlet 166 and the valve inlet 164 are in direct fluid communication which prevents aeration. The outlet reservoir 182 maintains the proper fluid level and allows any additional fluid volume to be returned to the reservoir chamber 50 of the shock absorber 20. The outlet reservoir 182 and the stop plate 180 may be made of plastic or metal.

The PCB assembly 112 is disposed between the upper rod guide 104 and the lower rod guide 106. The PCB assembly 112 is aligned to receive the terminals 151 of the coil assembly 142. The PCB assembly 112 includes a PCB locator 184, the wire assembly 123, and a PCB 186. The PCB 186 has an annular shape and defines one or more holes 188. The PCB further includes the wire assembly 123 which is fixedly coupled to the PCB 186.

The PCB locator 184 has a first ring 190 and a second ring 192 which are radially coupled via one or more stems 194. The first ring 190 has a smaller diameter than the second ring 192. The PCB locator 184 may include one or more alignment pins 196 which align with the holes 188 on the PCB 186. The alignment pin 196 and the holes 188 define the correct orientation of the PCB 186. The PCB locator 184 may also include a guide tab 198 provided along the second ring 192. The guide tab 198 aids in the alignment of the PCB assembly 112 with the slot 122 of the upper rod guide 104. The guide tab 198 may also form a support surface for an outer O-ring 200 disposed along an outer surface of the lower rod guide 106.

Two O-rings 202, 204 are disposed between the PCB 186 and the PCB locator 184. More particularly, the first ring 190 of the PCB locator 184 may define an inner groove 206 and the second ring 192 may define an outer groove 208. One O-ring 202 is positioned at the inner groove 206 and the other O-ring 204 is positioned at the outer groove 208. The PCB 186 is disposed on top of the PCB locator 184 with the O-rings 202, 204 disposed between the PCB locator 184 and the PCB 186. The O-rings 202, 204 isolate the PCB 186 from vibrations, and the O-rings 202, 204 and the grooves 206, 208 support an inner diameter and an outer diameter of the PCB 186.

The PCB 186 may be used to provide power to actuate the electronically controlled valves 114 of the valve assembly 108. For example, each electronically controlled valve 114 may be a two position valve which has a different flow area in each of the two positions. Each electronically controlled valve 114 is electrically coupled to the PCB 186. For example, the coils 148 of the coil assembly 142 are electrically coupled to the PCB 186.

For a given electronically controlled valve 114, the valve inlet 164 of the electronically controlled valve 114 aligns with a respective hole 140 defined by the orifice tube 138 and a respective radial port 130 defined by the lower rod guide 106. The spool 146 moves in a sliding motion in the spool chamber 162. A return spring 210 is disposed within the spool 146. For example, the return spring 210 may be pressed-fit into an opening of the spool 146. The spool 146 is positioned adjacent to the coil 148, such that return spring 210 is positioned between the spool 146 and the coil 148.

When there is no power provided to the coil assembly 142, the damping characteristics will be defined by the flow area of the electronically controlled valve 114 in a first position. The movement of the spool 146 is controlled by supplying power to the coil 148 to move the electronically controlled valve 114 to a second position. The electronically controlled valve 114 can be kept in the second position by continuing to supply power to the coil 148 or by providing means for retaining the electronically controlled valve 114 in the second position and discontinuing the supply of power to the coil 148. The means for retaining the electronically controlled valve 114 in the second position can include mechanical means, magnetic means or other means known in the art.

Once in the second position, movement to the first position can be accomplished by terminating power to the coil 148 or by reversing the current or reversing the polarity of the power supplied to the coil 148 to overcome the retaining means. The amount of flow through the electronically controlled valve 114 has discrete settings for flow control in both the first position and the second position.

It should be understood that when multiple electronically controlled valves 114 are used as part of the valve assembly 108, each electronically controlled valve 114 may have a different flow area in one or both positions. By having a different flow area in one or both positions, the total flow area through the plurality of electronically controlled valves 114 can be set at a specific number of total flow areas depending on the position of each electronically controlled valve. Each electronically controlled valve 114 can have a different flow area, the combinations thereof can determine the total flow area available.

Figure 3:
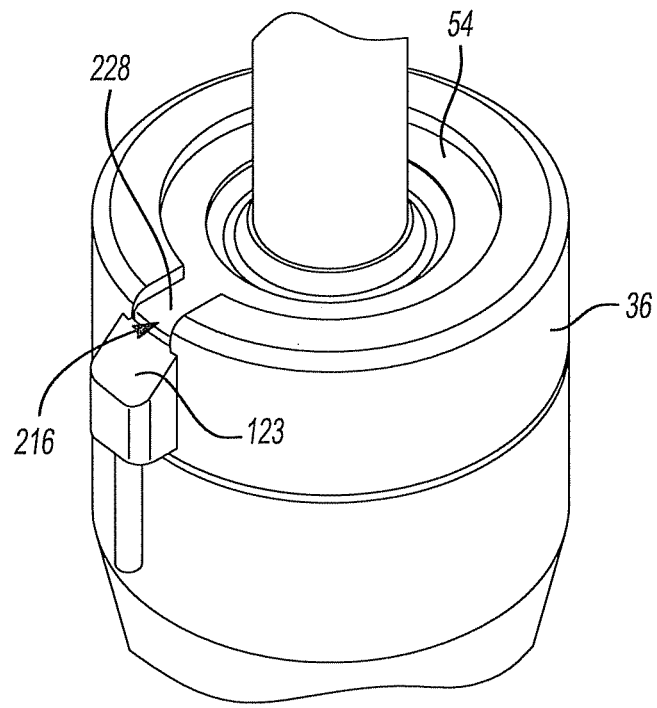
FIG. 3 is an enlarged side view of a rod guide assembly disposed within a reserve tube of the shock absorber.
Figure 4:
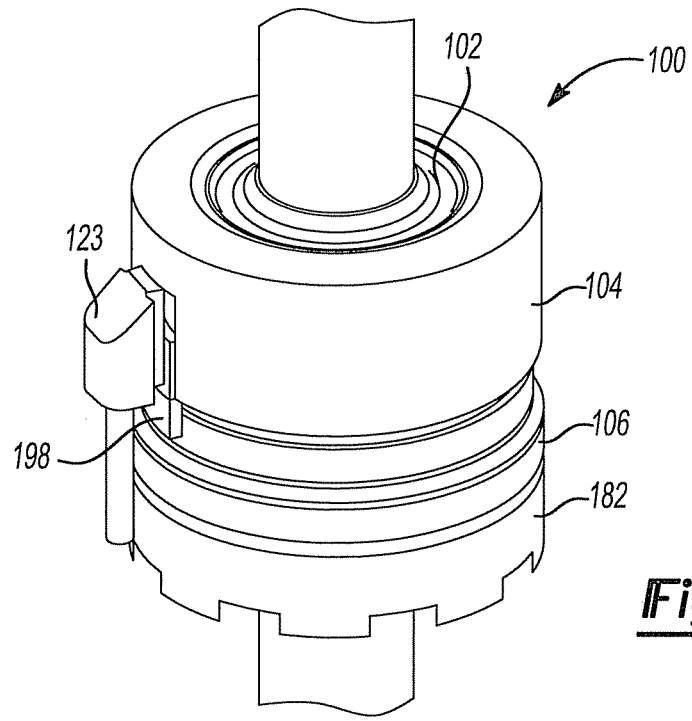
FIG. 4 is an enlarged side view of the rod guide assembly of the shock absorber.
Figure 10:
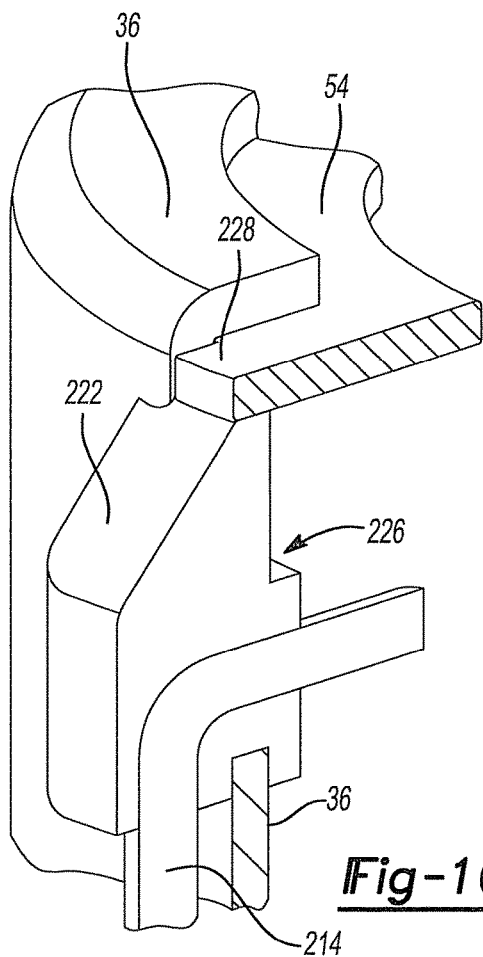
FIGS. 10 and 11 are enlarged views of a wire assembly.
Figure 11:
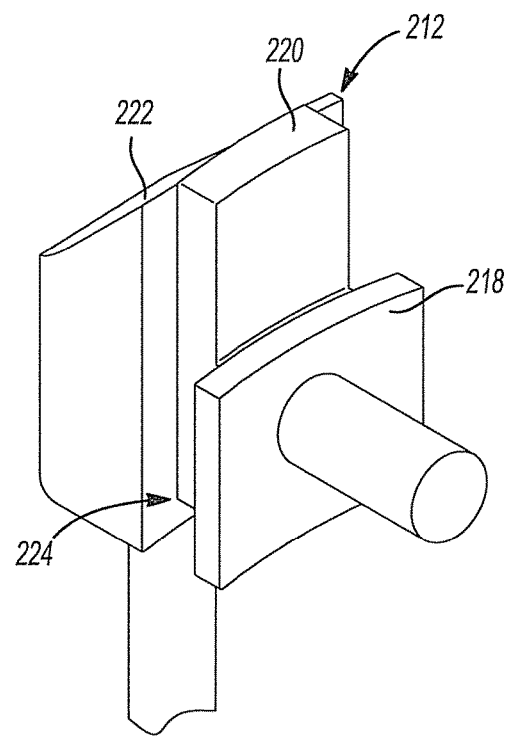

With reference to FIGS. 10 and 11, the wire assembly 123 has a connector 212 which is fixedly coupled to a cable 214. The connector 212 may be, for example, molded onto the cable 214 or molded separately, then bonded to the cable 214. The cable 214 includes multiple wires which are coupled to the PCB 186. The connector 212 is configured to seal to various interfaces such that particles and/or fluids may not enter the shock absorber 20 and fluid may not leak from the shock absorber 20. Specifically, the connector 212 is positioned in the slot 122 of the upper rod guide 104 (FIGS. 4 and 5) and a slot 216 of the reserve tube 36 (FIG. 3). The connector 212 forms a seal around with the load ring 54, the upper rod guide 104, and the reserve tube 36. The connector 212 may include an inner member 218, a middle member 220 and an outer member 222. The inner member 218, the middle member 220 and the outer member 222 form a groove 224 that extends along three sides of the connector 212.

The inner member 218 aligns with the guide tab 198 of the PCB locator 184 and the slot 122 of the upper rod guide 104. The portion of the outer wall 120 of the upper rod guide 104 that forms the slot 122 aligns with a first side 226 of the connector 212 formed by the inner member 218 and the middle member 220. A tab 228 of the load ring 54 is disposed on top of the middle member 220.

The connector 212 interfaces with an inner surface of the reserve tube 36, such that the slot 216 of the reserve tube 36 receives the connector 212 and an edge of the reserve tube 36 that defines the slot 216 aligns within the groove 224 of the connector 212. The outer member 222 of the connector 212 is configured to abut with an outer surface of the reserve tube 36 and extends over the slot 216 of the reserve tube 36.

For ease of manufacturing the rod guide assembly 100, an alignment feature, such as an alignment slot 230 may be defined on the components. For example, the upper rod guide 104, the lower rod guide 106, the coil assembly 142, each of the rings 168, 170, 172 of the valve flow guide 144 and the orifice tube 138, may have an alignment slot 230 to ensure proper orientation of the components with respect to one another. To properly orientate the PCB assembly 112 onto the lower rod guide 106, the PCB locator 184 may include a tab 232 (FIGS. 7 and 15) that aligns with a depression 234 defined on the lower rod guide 106.

Figure 12:
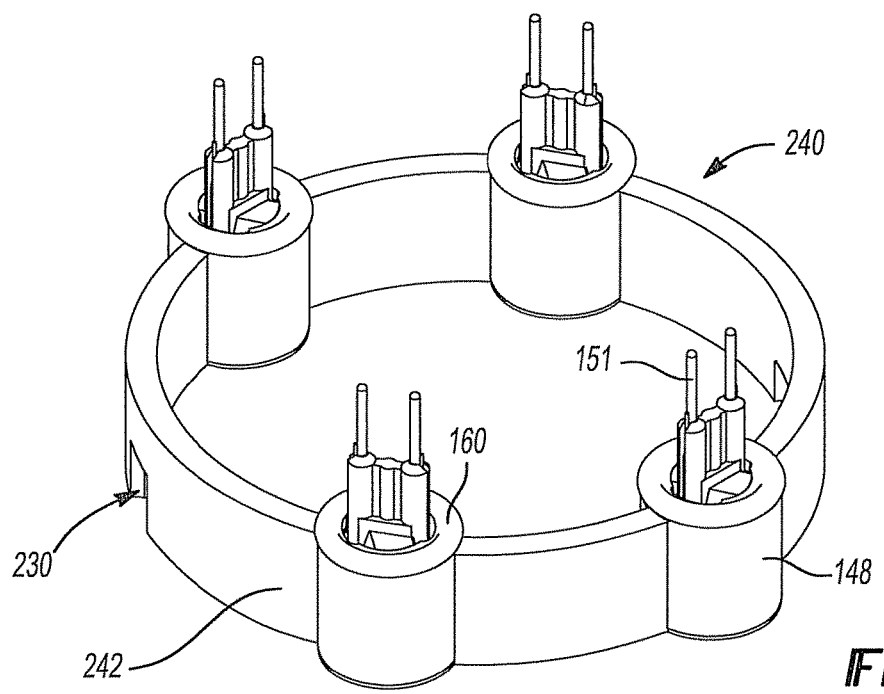
FIG. 12 illustrates a coil assembly having a thin annular body.

In the example embodiment, the coil assembly 142 is depicted as having a thick annular body 150 which substantially encases the coils 148. Alternatively, the valve assembly 108 may include a coil assembly 240 which has an annular body 242, as shown in FIG. 12. The annular body 242 is thinner than the annular body 150 which may reduce the cost of the coil assembly. Both annular bodies 150, 242 align the coils 148 relative to each other and secure the coils 148 in position. Accordingly, the annular body of the coil assembly may be configured in various suitable shapes to align and couple the coils and is not limited to the figures shown herein.

Figure 13A:
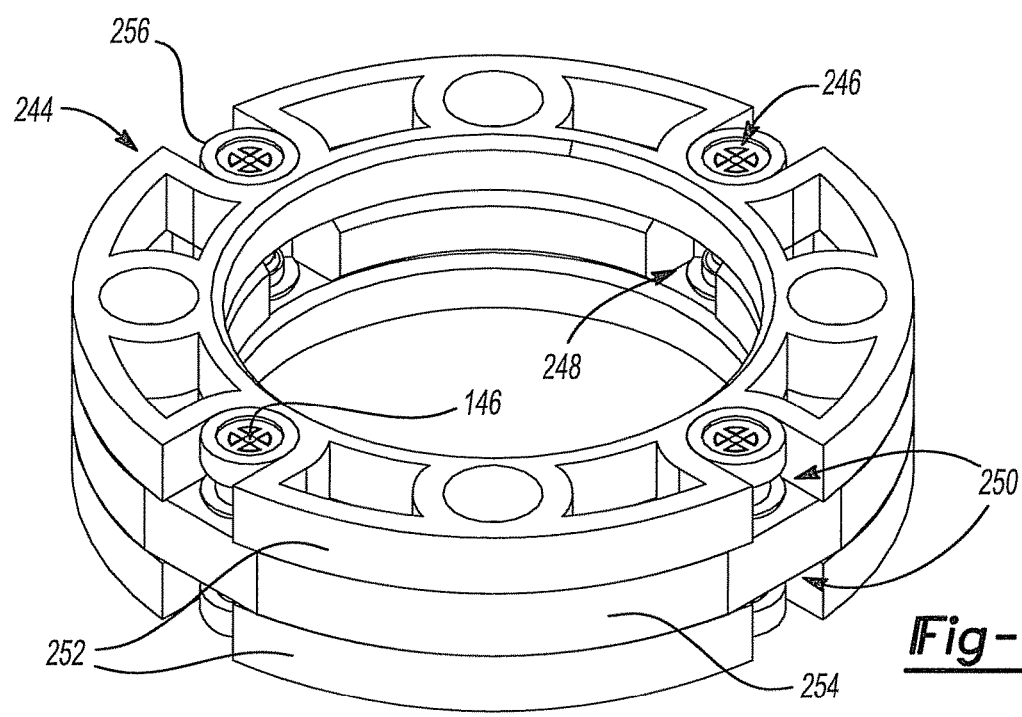

In the example embodiment the valve assembly 108 includes the valve flow guide 144 which includes rings 168, 170, 172. Alternatively the valve assembly 108 may include a valve flow guide 244 shown in FIGS. 13A-13B. The valve flow guide 244 also defines a spool chamber 246, a valve inlet 248, and valve outlet 250. More particularly, the valve flow guide 244 includes at least two valve outlets rings 252, a valve inlet ring 254, and one or more metering sleeves 256. The number of metering sleeves 256 is equal to the number of electronically controlled valves 114. The metering sleeves 256 replace the metering rings 170 of the valve flow guide 144. Similar to the metering rings 170, the metering sleeves 256 have metering edges 257 which align with or overlap with the metering lands 175 of the spool 146 to control the flow of fluid in the open/closed valve positions. The metering sleeves 256 are disposed in the spool chamber 246 defined by the valve outlet rings 252 and the valve inlet ring 254. The metering sleeve 256 may be fixedly coupled to one of the rings 250, 254, such as the valve inlet ring 254 to secure the alignment of the metering sleeve 256 with the valve outlet 250 and the vale inlet 248.

Figure 14:
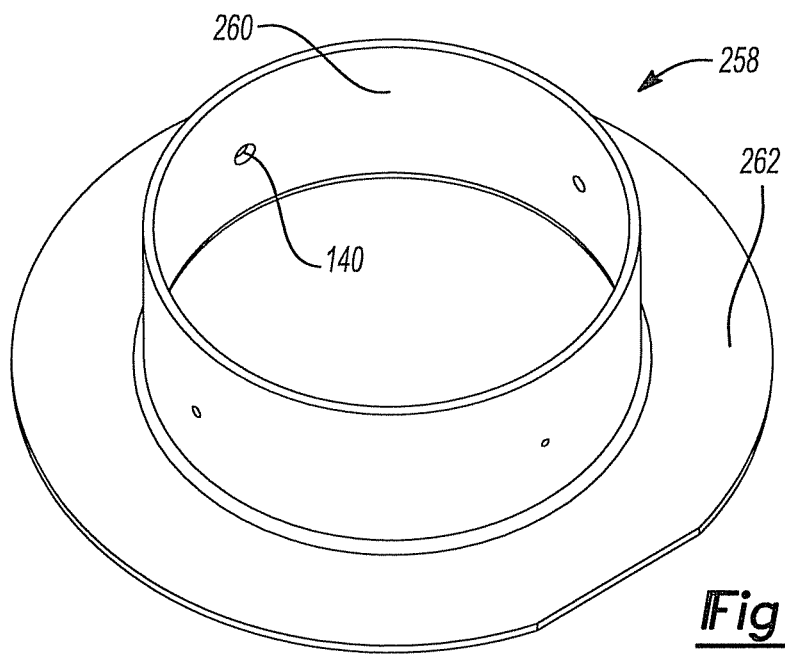
FIG. 14 illustrates an orifice tube.

In the example embodiment, the orifice tube 138 is disposed within the central shaft 126 of the lower rod guide 106. Alternatively, the orifice tube may be arranged on an outer surface of the central shaft 126. For example, with reference to FIG. 14, an orifice tube 258 may be utilized in lieu of the orifice tube 138. The orifice tube 258 defines the holes 140 which align with the radial port 130 of the lower rod guide 106. The orifice tube 258 may have a cylindrical body 260 with an annular plate 262 extending from the cylindrical body 260. The annular plate 262 acts like a stop plate for the spool 146 of the valve assembly 108, thereby removing the need for the stop plate 180. By having the orifice tube 258, the slip ring 136 may be retained within the lower rod guide 106 via a retainer ring. With the orifice tube 258 the outlet reservoir 182 is coupled to the orifice tube 258 in a manner similar to the stop plate 180. For example, the outlet reservoir 182 may be pressed-fit to the orifice tube 258.

Figure 15:
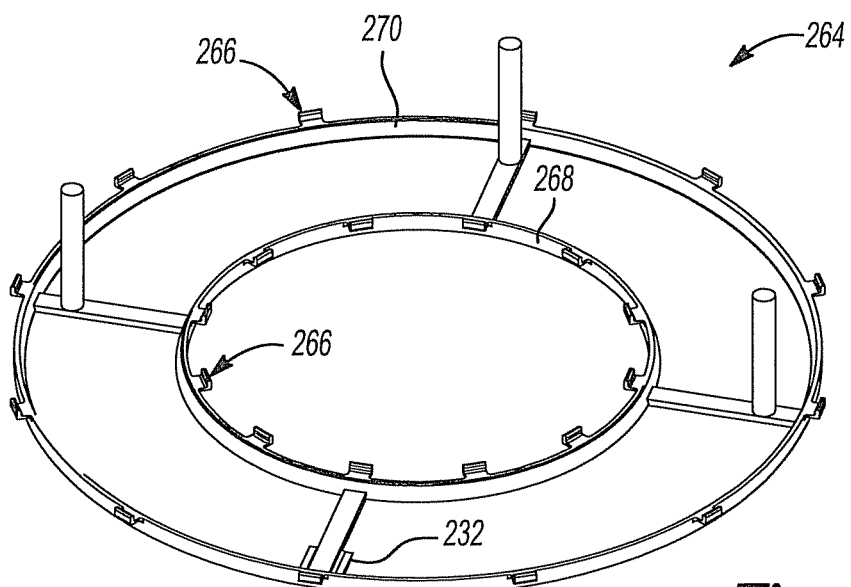
FIG. 15 illustrates a printed circuit board locator which has tabs along its inner and outer diameters.

In the example embodiment, the PCB locator 184 has the inner groove 206 and the outer groove 208 which support the O-rings 202, 204 and the PCB 186. Alternatively, the PCB assembly 112 may include a PCB locator 264 as shown in FIG. 15. The PCB locator 264 has multiple tabs 266 that extend from the inner surface of a first ring 268 and the outer surface of a second ring 270. The tabs 266 support the PCB 186 and isolate the PCB 186 from vibrations. Accordingly, with the PCB locator 264, the PCB assembly 112 may not need O-rings 202, 204.

The rod guide assembly 100 utilizes a multi-piece valve assembly for the electronically controlled valves. More particularly, the valve flow guide eliminates the internally machined grooves for forming the valve inlet, valve outlet and the metering edges, thereby reducing the cost of the electronically controlled valve. Furthermore, the multi-piece valve assembly aligns and couples the coils of the electronically control valves disposed in the shock absorber by way of an annular body formed around the coils. Such a configuration ensures proper alignment of the coils with other component, such as the PCB and the spool.

Figure 16:
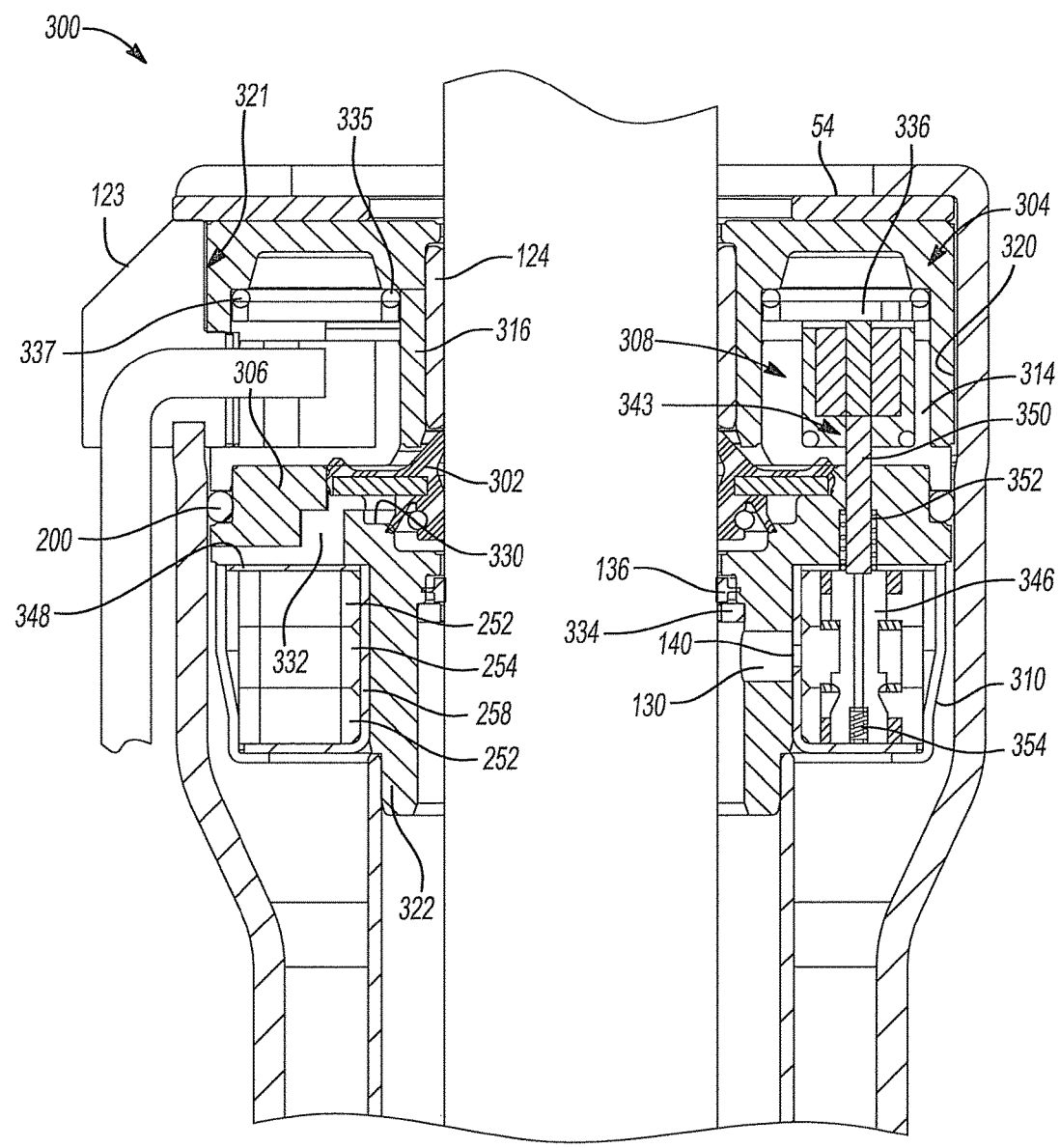
FIG. 16 is an enlarged cross-sectional view of a second example of a rod guide assembly for the shock absorber.
Figure 17:
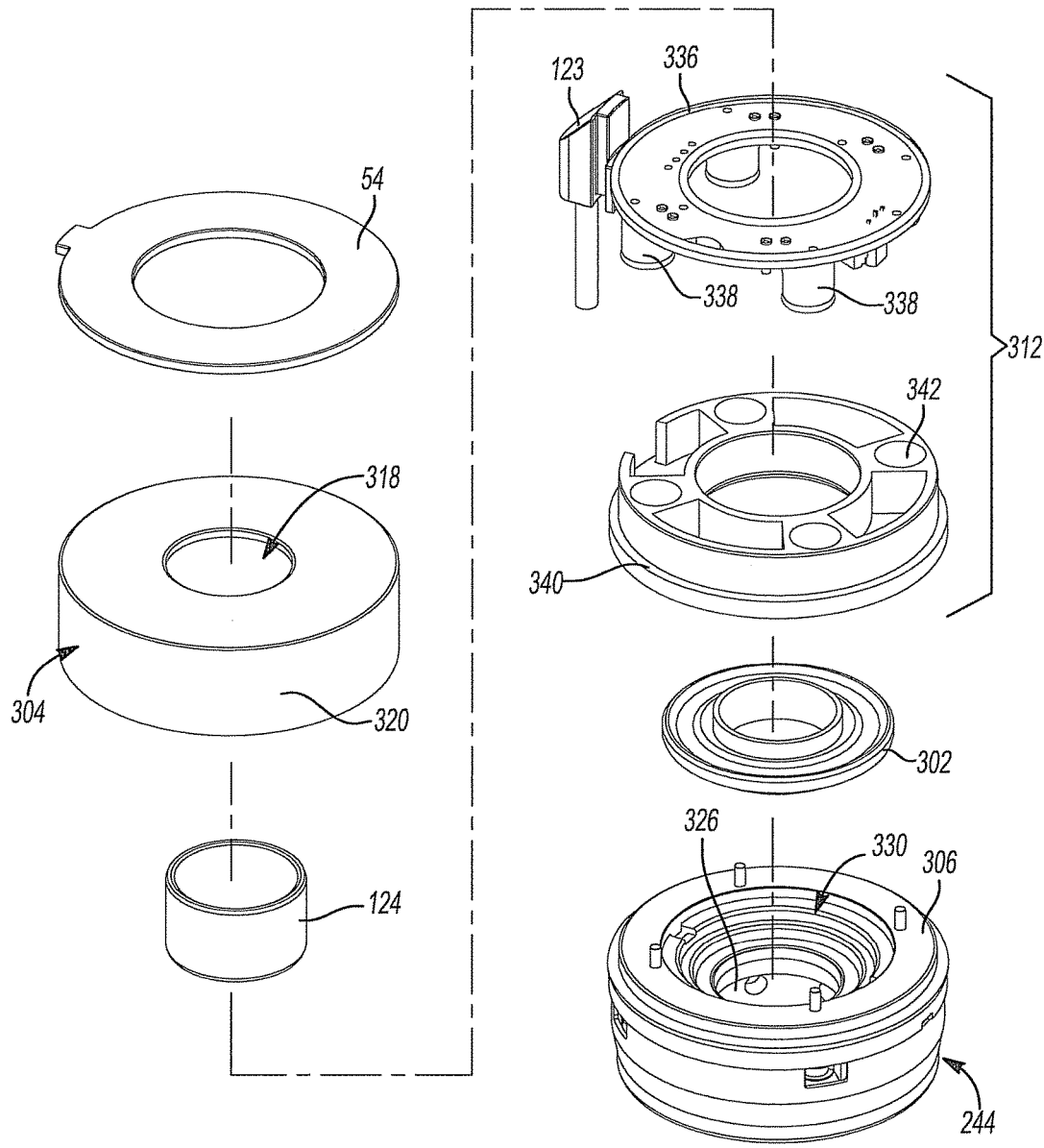
FIG. 17 is an exploded view of the rod guide assembly of FIG. 16.
Figure 18:
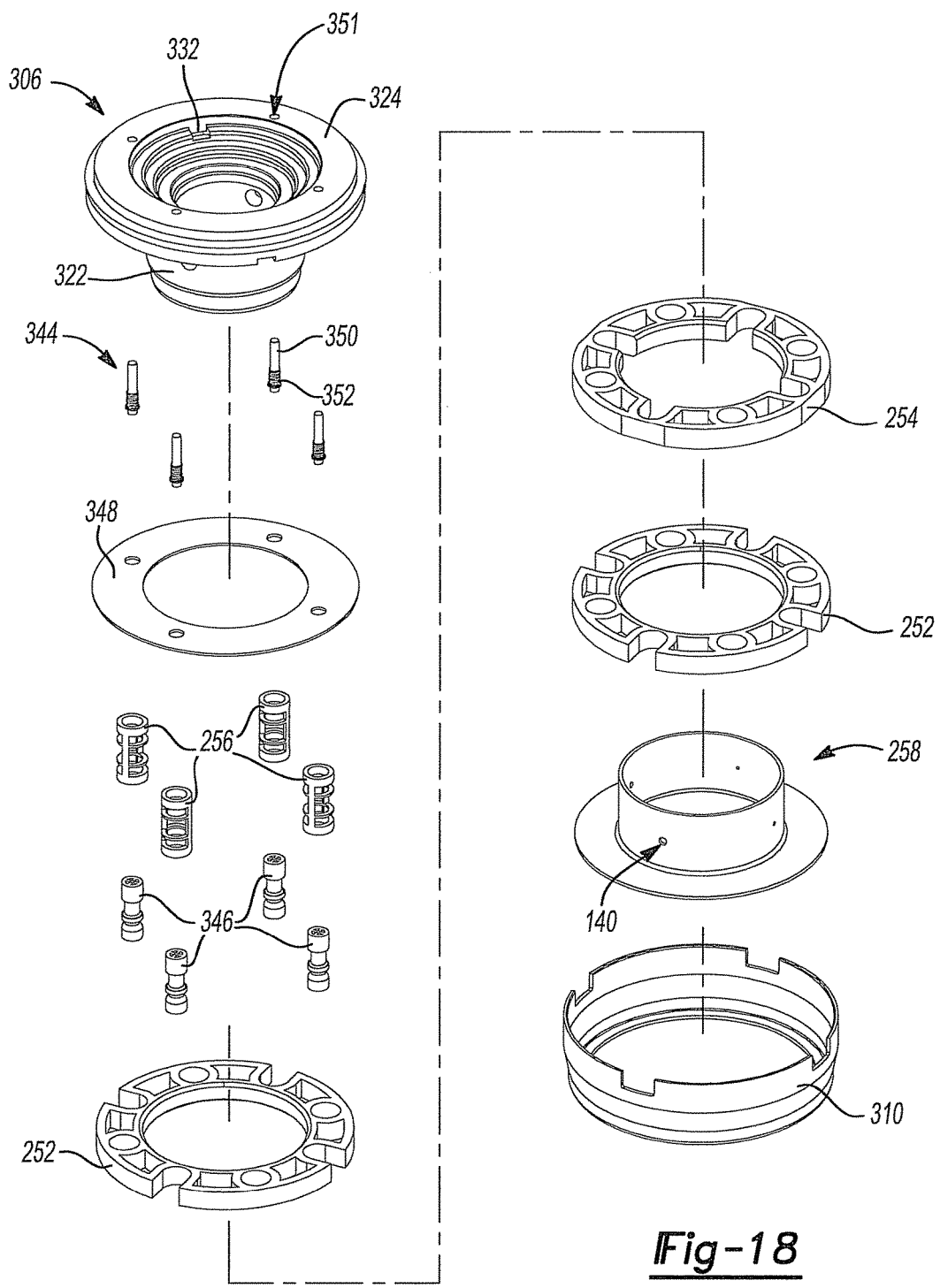
FIG. 18 is an exploded view of a lower rod guide and valve assembly of the rod guide assembly of FIG. 16.

As an alternative to the rod guide assembly 100, the shock absorbers 20, 26 may include a rod guide assembly 300 shown in FIGS. 16-18. Similar to the rod guide assembly 100, the rod guide assembly 300 is disposed within the reserve tube 36 and is secured by the load ring 54. It is readily understood that components having similar names for the various embodiments perform in a similar manner. Accordingly, for purposes of brevity, details regarding such component may not be described again.

The rod guide assembly 300 includes a seal 302, an upper rod guide 304, a lower rod guide 306, a valve assembly 308, and a printed circuit board (PCB) assembly 312. The valve assembly 308 forms one or more electronically controlled valves 314. In the example embodiment, the valve assembly 308 has four electronically controlled valves 314.

The seal 302 is disposed between the upper rod guide 304 and the lower rod guide 306. The upper rod guide 304 may have a body similar to the upper rod guide 104. Specifically, the upper rod guide 304 may have a substantially cylindrical shaped body with a central shaft 316 that defines a central aperture 318. An outer wall 320 of the upper rod guide 304 defines the slot 321 which accommodates the wire assembly 123. The bearing 124 is disposed within the central shaft 316 of the upper rod guide 304.

The lower rod guide 306 has a central shaft 322 with an annular shoulder 324 extending from the central shaft 322. The central shaft 322 defines a central aperture 326 which aligns with the central aperture 318 of the upper rod guide 304. The pressure tube 30 is fixedly coupled to the central shaft 322. The central shaft 322 defines one or more radial ports 130. The annular shoulder 324 of the lower rod guide 306 defines a seal cavity 330 which is concentrically arranged about the central aperture 326 for accommodating the seal 302. The annular shoulder 324 also defines one or more drainback ports 332 that extend from the seal cavity 330 to the outer diameter of the annular shoulder 324. Similar to the drainback passage 156, the drainback port 332 forms a flow path between a chamber formed between the seal 302 and the slip ring 136 to the reservoir chamber 50 of the shock absorber 20, thereby preventing hydraulic fluid from accumulating between the seal 302 and the slip ring 136.

The slip ring 136 and a retainer ring 334 are disposed within the central shaft 322 of the lower rod guide 306. In the example embodiment, the rod guide assembly 300 includes the orifice tube 258, which is arranged along the outer surface of the central shaft 322. Alternatively, the rod guide assembly 300 may include the orifice tube 138. With the orifice tube 138, the retainer ring 334 may be removed. As described above, the orifice tube 258 defines the holes 140 which aligns with the radial port 130 of the lower rod guide 306.

The rod guide assembly 300 further includes the PCB assembly 312. The PCB assembly 312 includes a PCB 336 and the wire assembly 123. The wire assembly 123 is disposed in the rod guide assembly 300 in a similar manner as in the rod guide assembly 100. The PCB 336 further includes one or more coils 338 which are wired directly the PCB 336. The number of coils 338 utilized is equal to the number of electronically controlled valves 314 of the valve assembly 308. Accordingly, in the example embodiment four coils 338 are coupled to the PCB 336. The PCB 336 may be isolated from vibration from the upper rod guide 304 via isolation O-rings 335, 337 which are disposed between the PCB assembly 312 and the upper rod guide 304 along the inner diameter and the outer diameter of the PCB assembly 312, respectively.

The PCB assembly 312 is disposed in a PCB retainer 340 which may be made of metal or plastic. The PCB retainer 340 defines multiple cavities and counter bores for housing the PCB 336. For example, the PCB retainer 340 includes a bore 342 for housing the coil 338. The PCB retainer 340 circumferentially encloses and isolates the PCB assembly 312. The PCB retainer 340 further locates and aligns the wire assembly 123 with the upper rod guide 304, and forms an enclosure between the upper rod guide 304 and the lower rod guide 306. The PCB retainer 340 also interfaces with the seal 302 and retains the O-ring 200 disposed on a surface of the lower rod guide 306.

In the example embodiment, the valve assembly 308 includes one or more solenoid assemblies 343 and one or more spools 346. The solenoid assembly 343 includes the coil 338 and an actuating pin assembly 344. To retain the spools 346 within the valve flow guide 244, a stop plate 348 is disposed between the lower rod guide 306 and the valve flow guide 244. While in the example embodiment the valve assembly 308 utilizes the valve flow guide 244, the valve assembly 308 may alternatively use the valve flow guide 144. Furthermore, the valve flow guide of the rod guide assembly 300 may be made of plastic, ceramic, or a non-magnetic metal.

In the example embodiment four actuating pin assemblies 344 are provided; one for each electronically controlled valve 314. Each actuating pin assembly 344 includes an actuating pin 350 and a returning spring 352. The actuating pin 350 is disposed between the coil 338 and the spool 346. The actuating pin 350 extends through the lower rod guide 306 via an opening 351 defined by the lower rod guide 306. The returning spring 352 is disposed around the actuating pin and is adjacent to the spool 346. The returning spring 352 exerts a force upon the actuating pin 350 to hold the actuating pin 350 down and away from the coil 338. The actuating pin 350 can be made of a magnetic material.

The spool 346 is disposed within the spool chamber 246 of the valve flow guide 244. The spool 346 moves axially within the spool chamber 246 between the stop plate 348 and the orifice tube 258. A push spring 354 is disposed within the spool 346 at an end of the spool 346 opposite from the actuating pin 350. The push spring 354 exerts a force upon the spool 346 such that the spool 346 is continuously contacting the actuating pin 350. The spool 346 can be made of metal or plastic.

Similar to the rod guide assembly 100, the rod guide assembly 300 further includes an outlet reservoir 310, which is arranged around the lower rod guide 306. The outlet reservoir 310 extends substantially up to and around the valve flow guide 244 and is retained by way of the orifice tube 258.

For a given electronically controlled valve 314, when there is no power provided to the coil 338, the damping characteristics will be defined by the flow area of the electronically controlled valves 314 in a first position. The movement of the spool 346 is controlled by the coil 338 and the actuating pin assembly 344. More particularly, the actuating pin assembly 344 is electromechanically actuated by the coil 338 which is in the upper rod guide 304. When power is supplied to the coil 338, the coil 338 generates a magnetic flux field that attracts the actuating pin 350. The actuating pin 350 is displaced until it is adjacent to the coil 338, thereby closing an air gap between the coil 338 and the actuating pin 350. The spool 346 which is in contact with the actuating pin 350 is also displaced, thereby placing the electronically controlled valve 314 in a second position. The electronically controlled valve 314 can be kept in the second position by continuing to supply power to the coil 338 or by providing a means for retaining the electronically controlled valve 314 in the second position and discontinuing the supply of power to the coil 338. The means for retaining the electronically controlled valve 314 in the second position can include mechanical means, magnetic means or other means known in the art.

Once in the second position, movement to the first position can be accomplished by terminating power to the coil 338 or by reversing the current or reversing the polarity of the power supplied to the coil 338 to overcome the retaining means. Once power to coil 338 is removed/reversed, the magnet flux dissipates and the actuating pin is displaced to its original position via the return spring 352. Accordingly, the spool 346 which is continuously in contact with the actuating pin 350 is also displaced to its original position. Both the return spring 352 and the push spring 354 place an axial force on their respective components (i.e., actuating pin 350 and spool 346). The net difference between the axial force is such that the spool 346 remains in the original position when no electrical power is provided to the coil 338. In other words, the electronically controlled valve 314 remains in the first position when no power is supplied to the coil 338.

Figure 19:
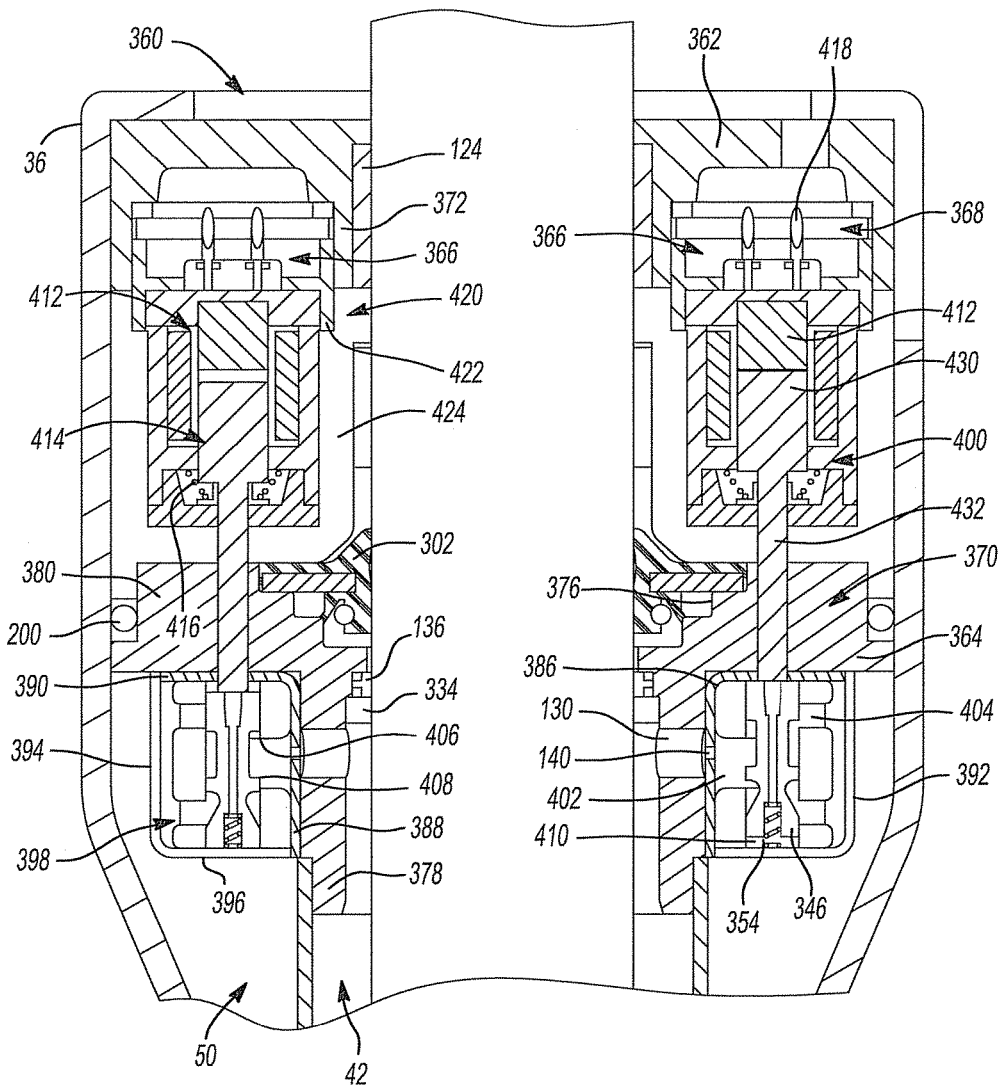
FIG. 19 is an enlarged cross-sectional view of a third example of a rod guide assembly for the shock absorber.
Figure 20:
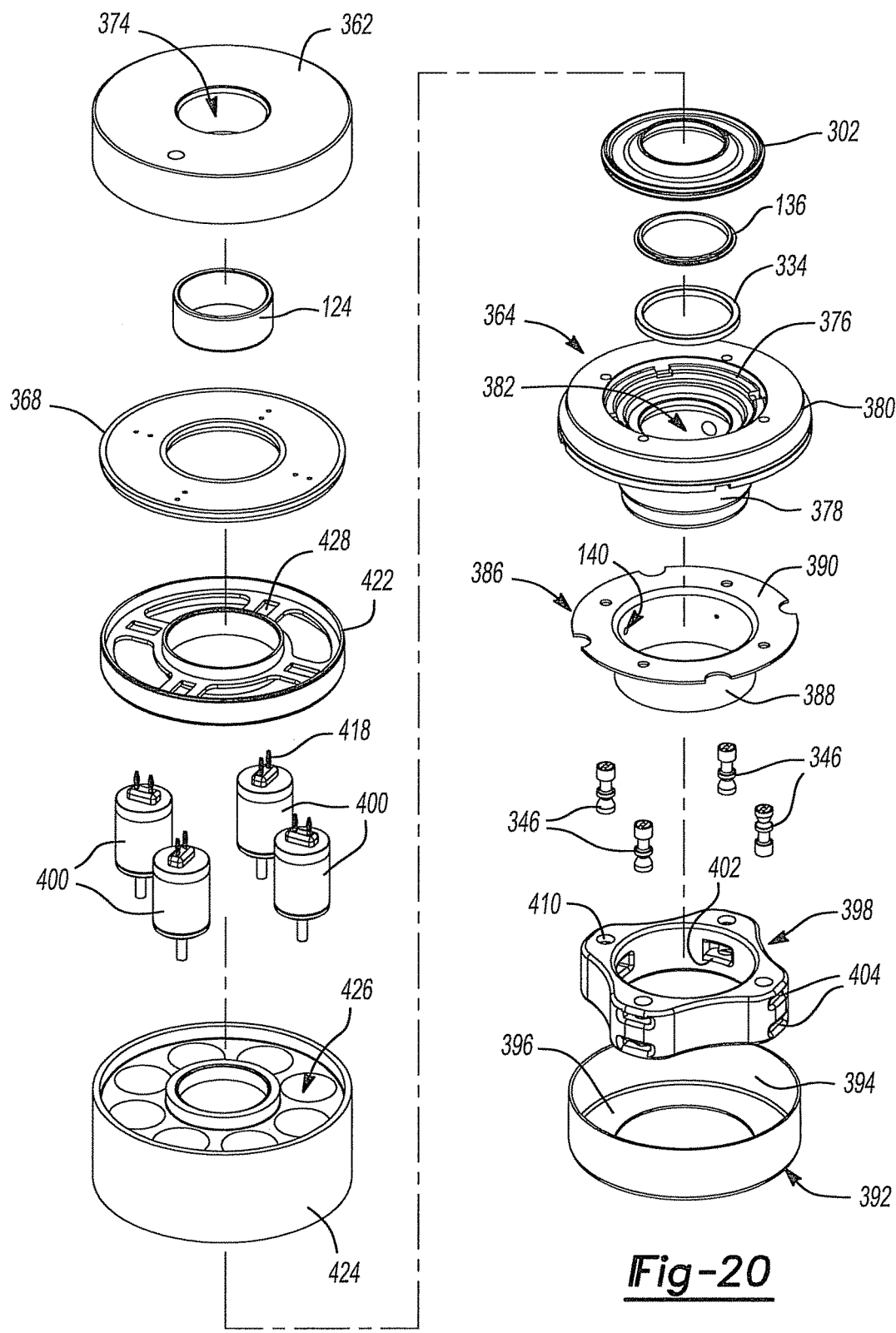
FIG. 20 is an exploded view of the rod guide assembly of FIG. 19.

As a variation of the rod guide assembly 300, the shock absorbers 20, 26 may include a rod guide assembly 360. With reference to FIGS. 19 and 20, the rod guide assembly 360 is similar to the rod guide assembly 300 in that the solenoid assembly of the electronically controlled valve is disposed between the upper rod guide and the lower rod guide, and is electronically coupled to the spool via an actuating pin. The rod guide assembly 360 includes a solenoid assembly 400, as described in detail below, in lieu of the solenoid assembly 343 of the rod guide assembly 300.

The rod guide assembly 360 includes an upper rod guide 362, a lower rod guide 364, a valve assembly 366, and a PCB assembly 368. The valve assembly 366 forms one or more electronically controlled valves 370. In the example embodiment, the valve assembly 366 has four electronically controlled valves 370.

Various features described with regard to the rod guide assembly 100 and/or the rod guide assembly 300 may not be represented in FIGS. 19 and 20 for the rod guide assembly 360 for the purpose of brevity. However, it is readily understood that such features are also included in the rod guide assembly 360 even if not shown. For example, it would be readily understood that the PCB assembly 368, includes a PCB, a PCB locator, and a wire assembly.

The upper rod guide 362 has a central shaft 372 which defines a central aperture 374. The bearing 124 is disposed in the central shaft 372. The seal 302 is disposed between the upper rod guide 362 and the lower rod guide 364. Specifically the seal 302 is disposed at a seal cavity 376 defined by the lower rod guide 364.

The lower rod guide 364 has a central shaft 378 with an annular shoulder 380 extending from the central shaft 378. The central shaft 378 defines a central aperture 382 which aligns with the central aperture 374 of the upper rod guide 362. The central shaft 378 defines one or more radial ports 130. The slip ring 136 and the retainer ring 334 are disposed within the central shaft 322 of the lower rod guide 306.

An orifice tube 386 which is similar to the orifice tube 258 is arranged along the outer surface of the central shaft 378 of the lower rod guide 364. The orifice tube 386 defines the holes 140 which align with the radial port 130 of the lower rod guide 364. The orifice tube 386, like the orifice tube 258, has a cylindrical body 388 with an annular plate 390 extending from the cylindrical body 388. The annular plate 390 acts like a stop plate for the spool 346 of the electronically controlled valve 370. Specifically, the orifice tube 386 is arranged such that the annular plate 390 is disposed between the lower rod guide 364 and a valve flow guide 398 of the valve assembly 366.

With the orifice tube 386, the rod guide assembly 362 may utilize an outlet reservoir 392. The outlet reservoir 392 has a cylindrical body 394 with a base 396. The base 396 performs as a stop plate for the spool 346, such that the spool 346 travels between the annular plate 390 of the orifice tube and the base 396 of the outlet reservoir 392. It is readily understood that the rod guide assemblies 100, 300 may be configured to include the outlet reservoir 392 and/or the orifice tube 386. Similarly, the rod guide assembly 362 may be configured to include the outlet reservoir and/or the orifice tube of the rod guide assemblies 100, 300.

The valve assembly 366 includes a valve flow guide 398, one or more solenoid assemblies 400, and spools 346. The valve flow guide 398 defines a valve inlet 402, valve outlets 404, and provides a metering edge 406 for each of the electronically controlled valves 370. The metering edge 406 aligns with metering lands 408 of the spool 346. The valve flow guide 398 further defines a spool chamber 410 which houses the spool 346. The valve inlet 402 aligns with the hole 140 of the orifice tube 386 and the radial port 130 of the lower rod guide 364. The valve flow guide of the rod guide assembly 360 may be made of plastic, ceramic, or a non-magnetic metal.

The solenoid assembly 400 includes a coil 412, an actuating pin 414, and a return spring 416. The coil 412 includes terminals 418 which are electrically coupled to the PCB of the PCB assembly 368. The solenoid assembly 400 is aligned with the PCB assembly 368 and the lower rod guide 364 by way of a retainer 420 which includes a first member 422 and a second member 424. The second member 424 is similar to the PCB retainer 340 of the rod guide assembly 300. More particularly, the second member 424 defines multiple bores 426 for housing the solenoid assembly 400. The second member 424 further forms an enclosure between the upper rod guide 362 and the lower rod guide 364. The second member 424 also interfaces with the seal 302 and retains the O-ring 200 disposed on a surface of the lower rod guide 364.

The first member 422 is disposed over the second member 424. The first member 422 defines a slot 428 through which the terminal 418 of the solenoid assembly 400 extends through. The PCB assembly 368 is disposed over the first member 422. Accordingly, the solenoid assembly 400 is securely positioned between the upper rod guide 362 and the lower rod guide 364 by way of the retainer 420.

The actuating pin 414 has a step down diameter configuration in which a head 430 of the actuating pin 414 has a larger diameter than a body 432 of the actuating pin 414. The head 430 is positioned adjacent to the coil 412 within the solenoid assembly 400. The body 432 extends through the lower rod guide 364 and the orifice tube 368, and abuts with the spool 346. The return spring 416 is disposed around the body 432 and is adjacent to the head 430. The return spring 416 exerts a force upon the actuating pin 414 to hold the actuating pin 414 down and away from the coil 412. The actuating pin 414 can be made of a magnetic material. The spool 346 is continuously contacting the actuating pin 414 by way of the push spring 354.

The solenoid assembly 400 operates in a similar manner as the coil 338 and the actuating pin assembly 344 of the electronically controlled valve 314 of the rod guide assembly 300. More particularly, as part of the electronically controlled valve 370, when power is supplied to the coil 412, the actuating pin 414 is displaced until it is adjacent to the coil 412, thereby closing an air gap between the coil 412 and the actuating pin 414. Accordingly, the spool 346, which is in continuous contact with the actuating pin 414, also displaces, thereby placing the electronically controlled valve 370 in the second position. Once power to the coil 412 is removed/reversed, the magnet flux dissipates and the actuating pin 414 is displaced to its original position via the return spring 416. Accordingly, the spool 346 is also displaced to its original position, thereby placing the electronically controlled valve 370 in the first position.

Similar to the rod guide assembly 100, the rod guide assemblies 300, 360 utilize a multi-piece valve assembly for the electronically controlled valves 314, 370. More particularly, the valve flow guides eliminate the need for high precision internally machined grooves for forming the valve inlet, the valve outlet and the metering edges, thereby reducing the cost of electronically controlled valve.

With regard to the rod guide assembly 300, 360, the electronically controlled valve includes a solenoid assembly which is disposed between the upper rod guide and the lower rod guide. The solenoid assembly decouples the magnetic requirements from the hydraulic requirements for the subcomponents. Specifically, the solenoid assembly optimizes the magnetic requirements designed to translate axial motion to the spool of the electronically controlled valve. Accordingly, the spool and even the valve flow guide may now be made of an alternative material like plastic, ceramic, or non-magnetic metals. Thus, the cost of the rod guide assembly 300, 360 may be reduced.

The solenoid assembly further optimizes the magnetic flux path to achieve the desired peak and hold currents to move the actuating pin. The entire magnetic flux may be contained within the solenoid assembly. Thus, the retainer which holds the solenoid assembly may be made of metallic or non-metallic materials, thereby reducing the cost of the rod guide assembly.

Furthermore, by having the seal 302 disposed between the upper rod guide and lower rod guide, the drainback passage (i.e., drainback port 332) is simplified in comparison to the drainback passage 156 of the rod guide assembly 100. The drainback passage of the rod guide assembly 300 shown in FIG. 16 can be formed using axial motion of a manufacturing tool, whereas the drainback passage 156 of the rod guide assembly 100 required cross-drilled holes which adds cost to the lower rod guide.

Figure 21:
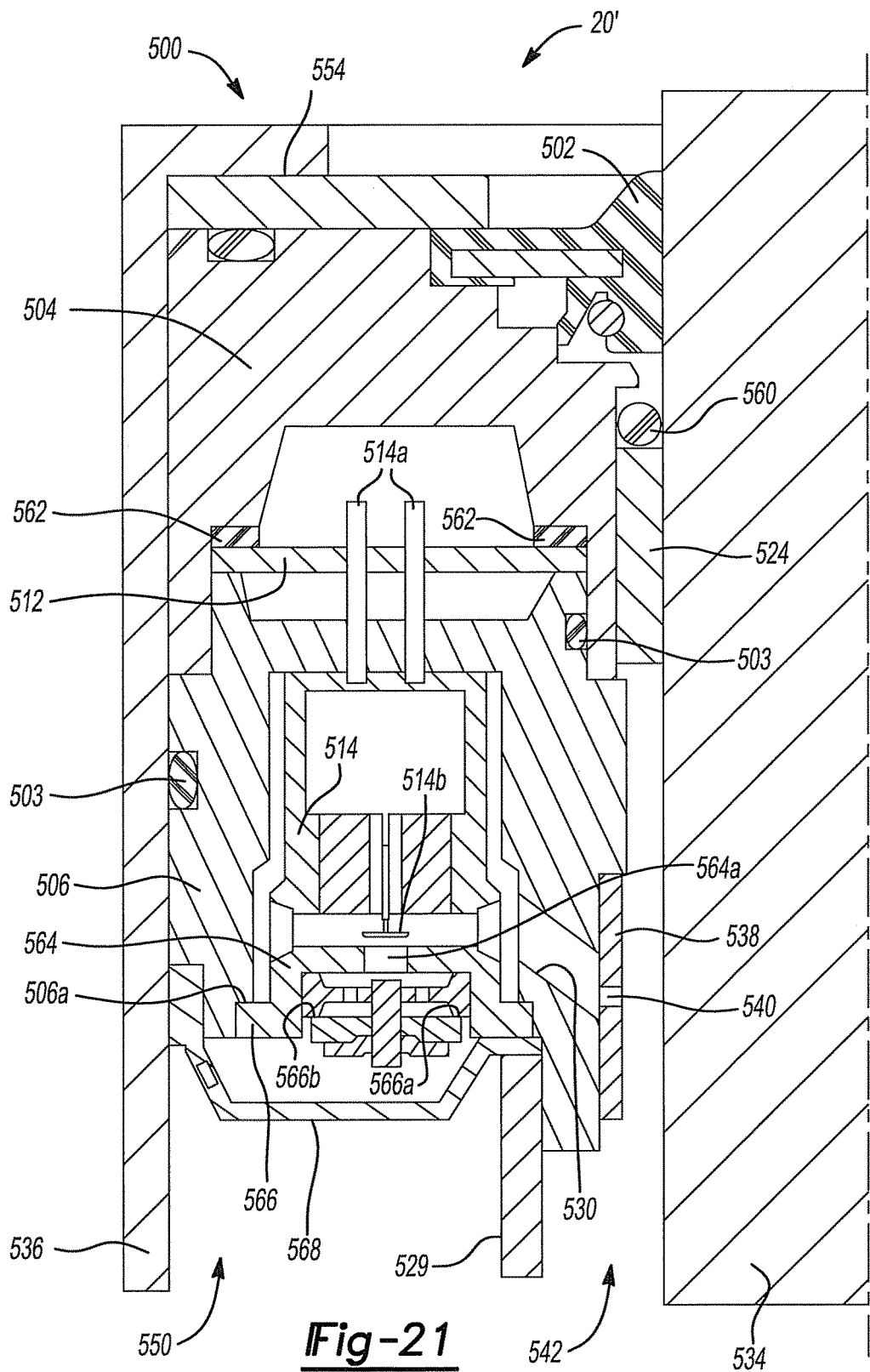
FIG. 21 is a simplified side cross sectional view of a rod guide assembly incorporating a solenoid valve cartridge along with a valve stack disposed at an outlet side of the solenoid valve cartridge.

Referring to FIG. 21, a portion of a shock absorber 20' is shown with a rod guide assembly 500 in accordance with another embodiment of the present disclosure. The rod guide assembly 500 is somewhat similar in construction to rod guide assembly 100 and reference numbers increased by 400 will be used to indicate components of the rod guide assembly 500 that are similar or identical to those used for corresponding components of the rod guide 100 shown in FIGS. 2-7. It will be appreciated that the shock absorber 20' may otherwise have the same construction as that shown in FIG. 2 for shock absorber 20.

The rod guide assembly 500 includes an upper rod guide 504 and a lower rod guide 506. The rod guides 504 and 506 are positioned in a space formed between a reserve tube 536 and a piston rod 534, and above an upper edge of a pressure tube 529. The volume between the reserve tube 536 and the pressure tube 529 defines a reserve chamber 550, and the volume within the pressure tube 529 defines a working chamber 542.

A load ring 554 seals an upper end of the upper rod guide 504 along with a standard oil seal 502. O-rings 503 seal the lower rod guide 506 relative to the reserve tube 536 and also relative to the upper rod guide 504. A rod bearing 524 enables linear movement of the piston rod 534 within the rod guide assembly 500. A slip ring seal 560 provides a seal between the piston rod 534 and the upper rod guide 504.

Sandwiched between the upper rod guide 504 and the lower rod guide 506 is a printed circuit board assembly (PCBA) 512. The PCBA 512 forms a subassembly which includes a printed circuit board assembly on which is mounted a plurality of components for forming an electronic control system. For simplicity, however, this component will simply be referred to as "PCBA 512", with it being understood that it is operating as an electronic control system.

The rod guide assembly 500 also includes electrically non-conductive isolators 562 which provide electrical isolation between the PCBA 512 and the upper rod guide 504. Disposed within a cavity 506a in the lower rod guide 506 is a solenoid valve cartridge ("SVC") 514. The SVC 514 is electrically coupled via a pair of conductors 514a to the PCBA 512 and forms a digital valve. The lower rod guide 506 includes a radially arranged inlet or port 530. The radially arranged port 530 is in communication with a hole 540 of a flow area control component 538, which in this example is shown as an orifice tube 538. Fluid is thus able to enter through the hole 540, the port 530 and into an interior area of the SVC 514. The SVC 514 has a moveable element 514b that moves linearly in response to signals from the PCBA 512 which energize the SVC 514 and move the moveable element 514b between a fully open state or position, and a fully closed state or position. Accordingly, the SVC 514 operates like a digital valve. The SVC 514 also includes a lower member 564 which seals off the bottom of the lower rod guide 506 and houses a form of pressure relief valve 566, which will be referred to in the following paragraphs simply as "additional valve" 566. The member 564 includes an opening 564a which forms a fluid flow outlet, which may be blocked off by the moveable element 514b when the SVC 514 is in its closed state. In the open state the SVC 514 permits flow through the opening 564a into the additional valve 566. An optional outlet reservoir 568 may be positioned adjacent an outlet side of the additional valve 566 to hold a small quantity of fluid to prevent bleed down of a pressure column within the rod guide assembly 500. While FIG. 21 shows only a single SVC 514, in practice two, three, four or even more SVCs 514 may be implemented in the rod guide assembly 500 in the manner shown in FIG. 21, and spaced circumferentially in the rod guide assembly around the piston rod 534. In practice, it is expected that the use of one or more SVCs 514 will be particularly popular for shock absorbers used in most vehicle applications. It will be appreciated that the SVC 514 described above is just one example of a suitable, electrically controlled valve that the rod guide assembly 500 may incorporate, and the rod guide assembly is therefore not limited to use with only the SVC 514 described above. Virtually any type of electrically actuated solenoid valve may be integrated into the rod guide assembly 500. The specific solenoid valve cartridge used may also be constructed from one or more components forming the moving and stationary parts of the solenoid-valve. Therefore, the solenoid valve cartridge may have a multiple piece outer body where the upper and lower portions of the solenoid valve cartridge are adjacent to each other forming the intended flow passages. Alternatively, the outer body may be a single piece with all flow passages formed into it. Therefore, the on (open) and off (closed) states of the solenoid valve cartridge would behave the same regardless of its one-piece or multi-piece construction.

Figure 23:
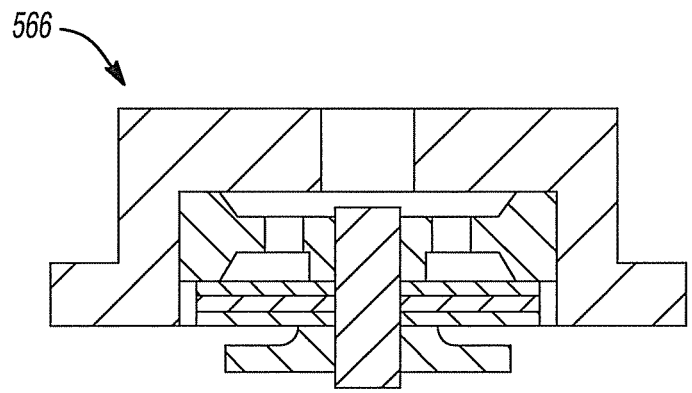
FIG. 23 shows an example of a clamp type valve disc that may be used at the outlet side of any one of the solenoid valve cartridges for the embodiments shown in FIGS. 21 and 22.

The additional valve 566, since it is positioned at the outlet side of the SVC 514, provides an additional means for discrete area flow control at lower flow rates when the SVC 514 is in its open state. The additional valve 566 may comprise a valve stack 566a formed by a well-known clamp disc arrangement, available from Tenneco of Lake Forest, Ill. The additional valve may also be a piston valve assembly available from Tenneco, which is shown in FIG. 23. Other types of valves that may form the additional valve 566 are a blow-off coil spring ("BOCS") arrangement 564' shown in FIG. 24 (or a blow-off disc arrangement), or even a check valve 546", shown in FIG. 25, for keeping oil retained at the outlet location to prevent aeration of the working fluid during discharge to the reservoir chamber. The additional valve 566 may also be formed by annular discs, by finger shaped discs, and/or may incorporate one or more bleed notches or orifices. If bleed notches or orifices are incorporated in the additional valve 566 along with a bleed passage in the member 564, then bleed control through the SVC 514, the member 564 and the additional valve 566 may be available even when the SVC 514 is in its closed state. In FIG. 21 the additional valve 566 is shown having the valve stack 566a which closes off a flow path 566b through the additional valve 566 when in the closed position, and opens the flow path 566b when in the open position. Again, however, any form of pressure responsive valve may be integrated into the rod guide assembly 500. The use of a pressure responsive valve at the outlet side of the digital valve adds the ability to achieve enhanced flow characteristics from an initial bleed area/orifice control (differential pressure versus flow is parabolic relationship), to a bending disc/spring rate having a linear relationship, and finally a secondary area/orifice control having parabolic relationship.

Therefore, the discrete steps from previously implemented rod guide assemblies having a digital valve (orifice control only) can be transitioned even more smoothly between the multiple settings (combinations), by the use of one or more additional valves at the outlet thereof. This is shown in FIGS. 28 and 29.

During a rebound stroke of the shock absorber 20' associated with the rod guide assembly 500, pressure builds above the passive piston assembly (e.g. piston assembly 32 in FIG. 2) on the piston rod 534. Fluid flows across the passive piston assembly (as the primary flow path). At the same time, fluid above the piston assembly flows through the hole 540 in the orifice tube 538 into the inlet port 530 of the rod guide assembly 500 (as a secondary flow path). The actuation of the SVCs 514 (assuming that two or more are included) controls the open or closed flow between the lower rod guide inlet port 530 for each SVC 514 and the outlet side of each SVC 514. When all SVCs 514 are in the closed position, this prevents any secondary flows through any of the additional valves 566, and all the damping force control is achieved by the passive piston assembly (e.g., piston assembly 32). When any given SVC 514 is in the open position, the secondary flow is permitted through its associated inlet port 530 to its associated additional valve 566.

During a compression stroke of the piston rod 534, the pressure builds below the passive piston assembly (e.g., piston assembly 32). The rod volume fluid flows across the passive base valve assembly (e.g., base valve assembly 38 in FIG. 2) as the primary flow path. At the same time, the remainder volume of fluid flow passes freely across the passive piston assembly and into the hole 540 of the orifice tube 538 adjacent the lower rod guide 506. By the terminology "remainder volume of fluid flow", it will be appreciated that as the piston rod assembly moves downward in compression, the total bore volume is being displaced. The portion of volume equal to "rod volume" flows through the base valve assembly 38. The "annular volume" which is (bore volume-rod volume) flows across the piston valve and into the chamber above the piston to replenish oil. When the digital valve(s) (e.g. SVC 514) in the rod guide assembly 500 open, the volume of oil in the annular chamber (between pressure tube 529 and rod 534) may flow directly into the reservoir chamber 550, acting like a bypass from the base valve assembly 38. Technically, what is going out the rod guide assembly 500 is a portion of rod volume that is not going out the base valve assembly 38. The transfer of annular volume above the piston occurs regardless. In a worst case scenario, the base valve assembly 538 is very stiff and all rod volume flows out the rod guide assembly 500 via the digital valves (e.g., SVCs 514) and negligible flow occurs through the base valve assembly 38. In this case, the same annular volume moves across the piston valve to always replenish the rebound side of the pressure column. Thus, it will be appreciated that the remainder of fluid volume flow through the digital valves (e.g., SVCs 514) depends upon the flow characteristics of the base valve assembly 38 tuning in combination with the digital valves. The rod volume is split between these different flow paths. The above dynamics also apply with regard to the piston valve assembly during rebound stroke. The flow split occurs between the digital valve 514 and piston valve assembly 32 depending upon the piston valve assembly tuning in combination with the digital valves. The annular volume is split between the different flow paths. At the same time, rod volume is being replenished in the pressure tube chamber between the piston valve and the base valve assembly 38. The replenishment occurs as the piston rod extends, and fluid flow equal to the rod volume is transferred from the reservoir chamber across the base valve 38.

Similar to the rebound stroke operation described above, the secondary fluid flow (i.e., remainder of fluid volume) is controlled by the SVCs 514. Each SVC 514 allows the secondary fluid flow into the additional valve 566 when the SVC is in its open state, and prevents the secondary fluid flow from passing into the additional valve 566 when the SVC is in its closed state. The orifice tube 538 and its hole 540, and the additional valve 566, operate in the same manner as described above for the rebound stroke.

The tuning parameters for the rod guide assembly 500 thus include the number of SVCs 514 used, the orifice tube hole 540 diameters (in this example one per SVC 514), and the additional valves 566. The additional valves 566 thus form an additional means for influencing damping characteristics of a shock absorber for a broad range of flow conditions from low flow rates to high flow rates (e.g., from 0 to 40 LPM). While it is expected that most applications will make use of multiple SVCs 514 all using the same type of additional valve 566, the use of different types of valve constructions with different ones of the SVCs 514 is also possible. Thus, one SVC 514 in the rod guide assembly 500 could include a clamped disc type of valve stack/assembly, while another SVC could include a coil spring or disc spring blow-off type of valve stack/assembly, and yet a third SVC 514 might include a check valve. Also, two or more different constructions of valve stacks for the additional valve 566 could be employed. For example, different SVCs 514 could have different numbers of stacked discs or discs which have different material compositions, to thus provide different pressure relief characteristics which expand the tuning parameters available for the shock absorber 20'.

Figure 22:
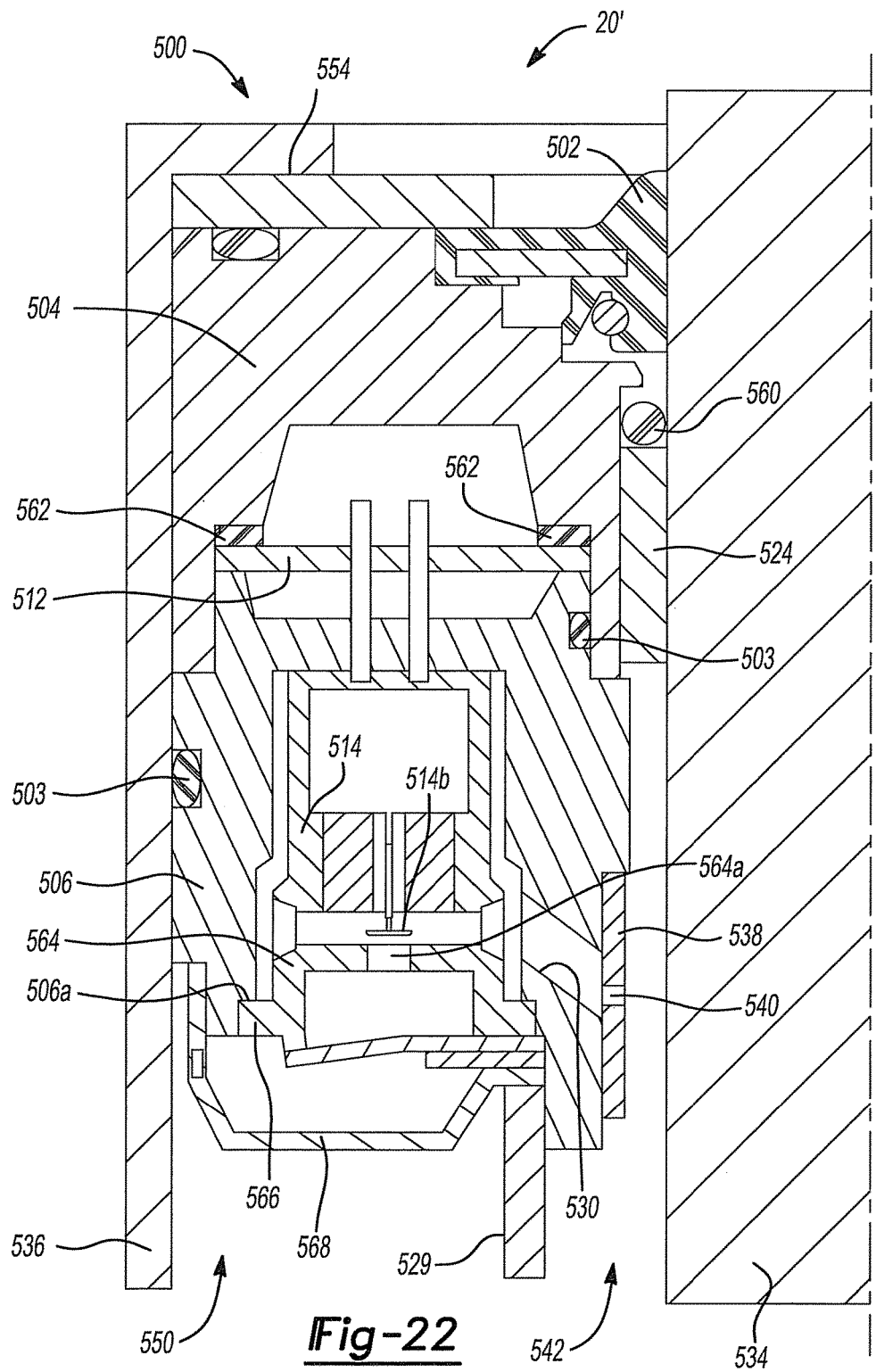
FIG. 22 is a simplified side view of another embodiment of the present disclosure in which the rod guide assembly incorporates a pressure regulated valve attached to a bottom side of the rod guide assembly.

FIG. 22 shows another embodiment where the rod guide assembly 500 includes the additional valve 566 attached at the outlet side of the lower rod guide 506. The additional valve 566 in this example is an annular disc which is trapped (i.e., clamped) between the pressure tube 529, the outlet reservoir 568 and the member 564. The additional valve 566 may instead comprise a plurality of annular discs which are effectively clamped together to operate as a single valve disc stack. The additional valve 566 disc(s) in this example may be preloaded against lands that are integral to the member 564. Accordingly, this manner of integrating the additional valve(s) 566 into the lower rod guide 506 may provide a particularly cost effective approach to providing the additional level of damping control afforded by the additional valve(s) 566.

Figure 26:
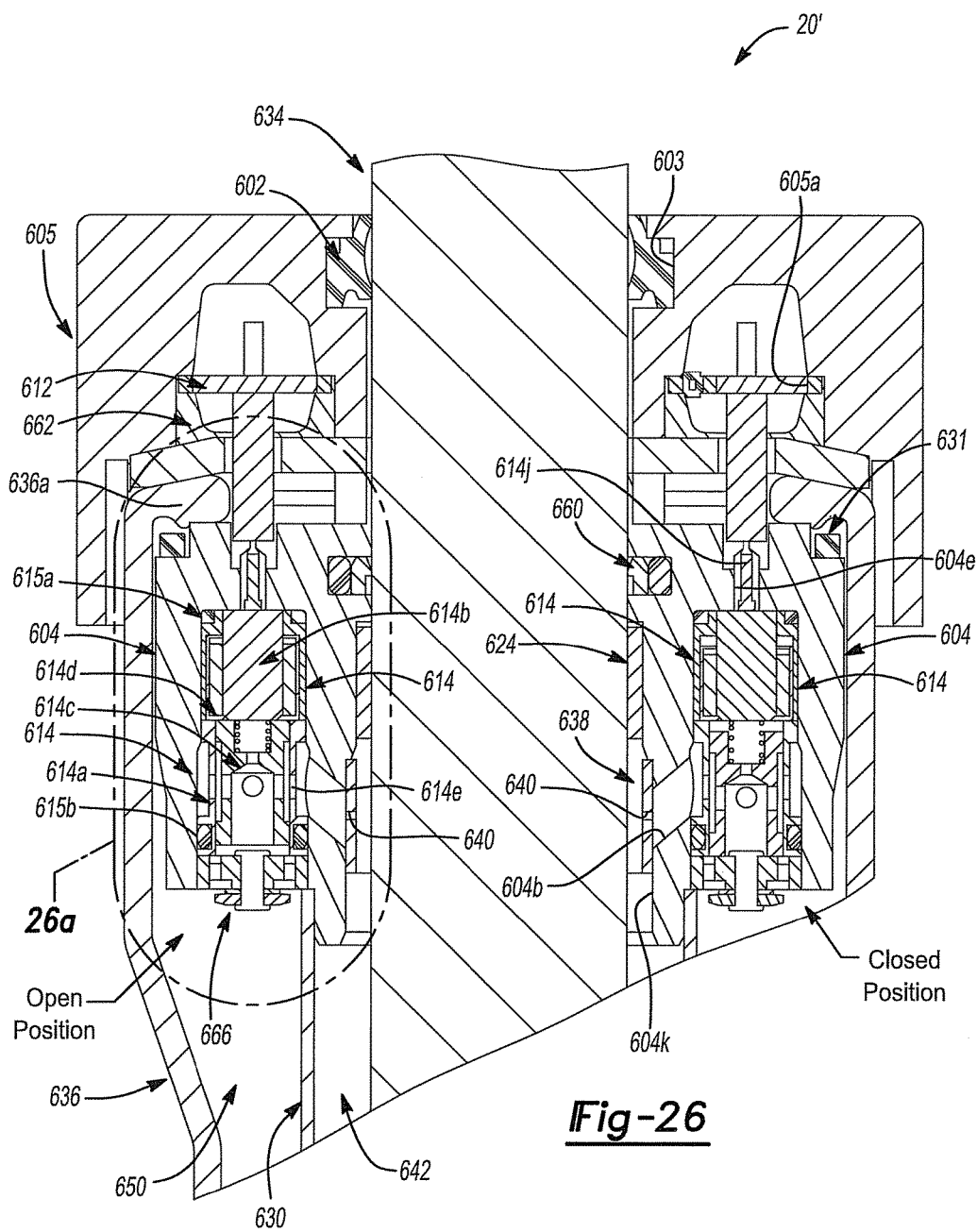
FIG. 26 shows another embodiment in which an electrically energizable coil is used to move a spool valve linearly within a valve housing, and where a disc valve is located at the outlet of the valve spool, and an electronic printed circuit board assembly is assembled external to the shock absorber and closed off using an upper cap.

Referring to FIG. 26, a rod guide assembly 600 is shown in accordance with another embodiment of the present disclosure. The rod guide assembly 600 is somewhat similar to the rod guide assembly 500, and components similar or identical to those described in connection with rod guide assembly 500 will be denoted with reference numbers increased by 100 over those used to describe the rod guide assembly 500. Operation of the rod guide assembly 600 is otherwise identical to that provided for rod guide assembly 500.

The rod guide assembly 600 in this example, rather than including independent upper and lower rod guide components, includes only a single annular rod guide component 604. The rod guide component 604 is disposed around a piston rod 634. A rod bearing 624 enables low friction sliding movement of the piston rod 634 relative to the rod guide component 604. A step seal 660 (i.e., twin seal) provides a fluid seal between the piston rod 634 and an upper edge of the rod guide component 604. An elastomeric scraper 602 is provided in a radially extending annular recess 603 of an upper cap 605 of an electronics cap assembly 605'. A PCBA 612 is disposed within an annular recess 605a in the upper cap 605. A non-electrically conductive isolator assembly 662 is provided to electrically isolate the PCBA 612 from other components of the rod guide assembly 600. The electronics cap assembly 605' (e.g., consisting of components such as 605, 612, 662) is positioned adjacent an upper edge 636a of a reserve tube 636 or rod guide component 604.

The rod guide component 604 of FIG. 26 is positioned adjacent an upper edge of a pressure tube 630. The volume between the pressure tube 630 and the reserve tube 636 forms a reserve chamber 650, and a working chamber 642 is formed within the pressure tube 630. A static seal 631 is provided at an upper end of the rod guide component 604 to seal the upper outer perimeter of the rod guide component relative to an upper edge of the reserve tube 636. Alternatively, the static seal 631 may be an O-ring and be located along the outer diameter of the rod guide component 604.

An orifice tube 638 having a plurality of circumferentially arranged holes 640 (only two being visible in FIG. 26) is positioned within a recess 604k of the rod guide component 604. The holes 640 may be of different diameters, as is visible in FIG. 26, although they need not necessarily have different diameters, and instead could all have the same diameter. A radially arranged or extending inlet port 604b of the rod guide component 604 is in registration with an associated one of the holes 640 and opens into an associated recess 604c in the rod guide component. A separate digital valve assembly 614 will have its inlet aligned with each one of the radially extending inlet ports 604b and one of the holes 640 in the orifice tube 638.

Figure 26A:
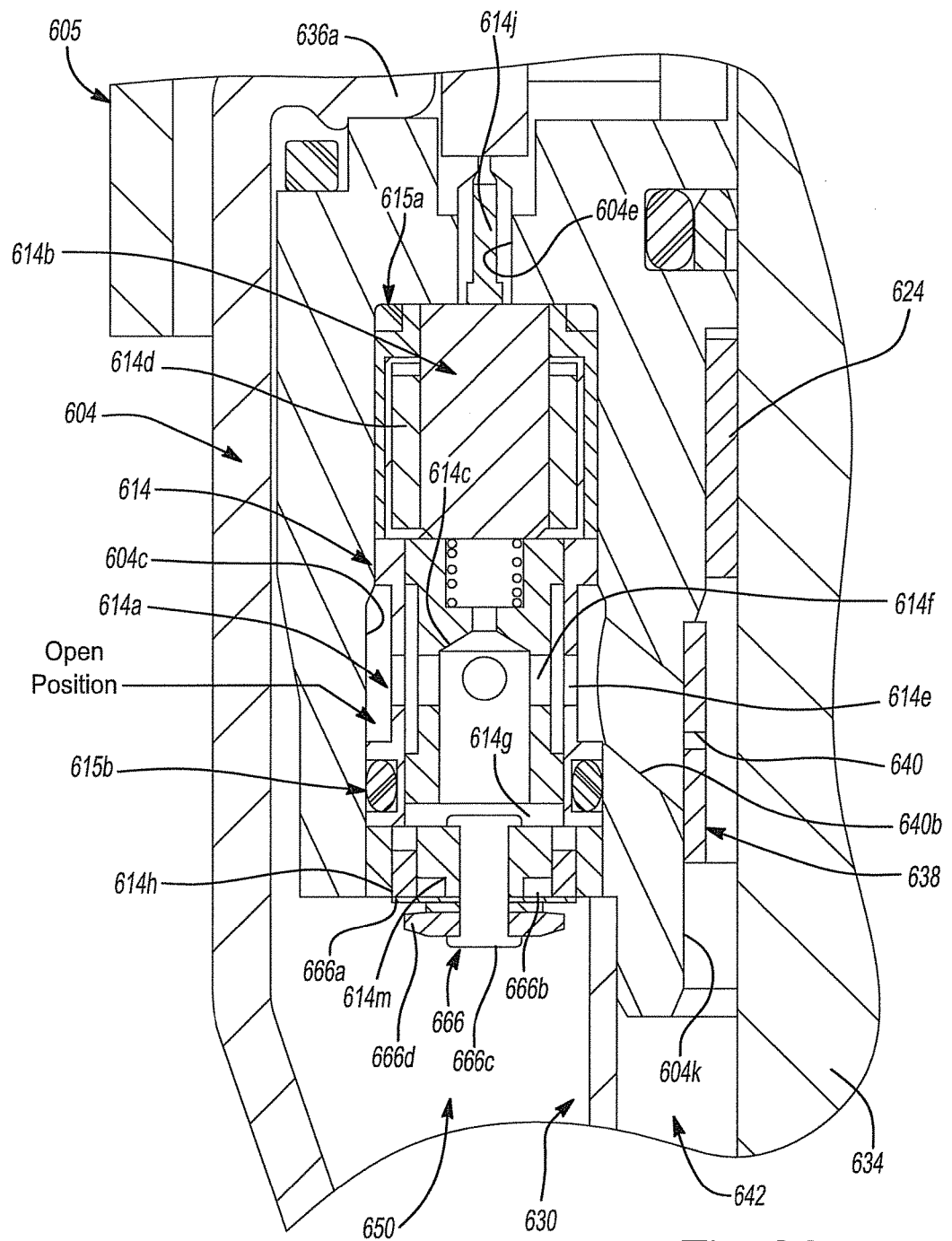
FIG. 26a shows the digital valve denoted by circle 26a in FIG. 26 in a highly enlarged fashion.

With reference to FIG. 26a, the digital valve assembly 614 (hereinafter simply "digital valve" 614) is shown in greater detail positioned within one of the recesses 604c of the rod guide component 604. Upper and lower O-rings 615a and 615b help to seal the digital valve 614 within the recess 604c. The digital valve 614 includes a valve body 614a, a coil 614b and a valve spool or poppet element 614c (hereinafter simply "valve spool element" 614c). The valve body 614a includes an inlet port 614e aligned with the radially extending inlet port 604b. The valve spool element 614c includes a port 614f which leads to an interior area thereof. An outlet 614g is formed at the bottom of the valve spool element 614c and communicates with the port 614f to permit flow through the interior of the valve spool element. Alternatively, the flow could be permitted around the exterior of the valve spool element 614c depending upon the clearance between the spool element and valve body metering edges (like shown for example in FIG. 5).

The digital valve 614 also includes a biasing element 614d which biases the digital valve into a normally closed position. This position is shown with the digital valve 614 on the right side of the rod guide assembly 600 in FIG. 26. By "normally closed" it is meant a position where the port 614f is not aligned with the port 614e of the valve body 614a, and thus no flow of fluid through the port 614f into and through the interior area of the valve spool element 614c is possible. The valve spool element 614c is linearly moveable within the valve body 614a in response to energization of the coil 614b. Energization of the coil 614b moves the valve spool element 614c into an open position as shown on the left side of the rod guide assembly 600 in FIG. 26. With the digital valve 614 in its open position, fluid may flow through the hole 640 in the orifice tube 638, through the radially extending inlet port 604b, through the port 614e in the valve body 614a, through the port 614f in the valve spool element 614c, and into the interior area of the valve spool element 614c to its outlet 614g.

Referring further to FIGS. 26 and 26a, a terminal 614j of the coil 614b extends through a bore 604e in the rod guide component 604 and into electrical communication with the PCBA 612. This enables electrical signals generated by the electronic control system on the PCBA 612 to control energization of the coil 614b, and thus movement of the valve spool element 614c between its normally closed position and its open position.

Figure 24:
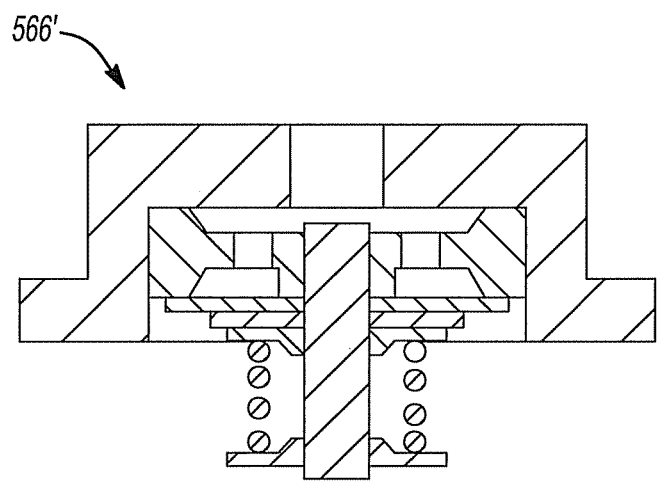
FIG. 24 shows an example of a blow-off spring type valve disc that may be used at the outlet side of any one of the solenoid valve cartridges for the embodiments shown in FIGS. 21 and 22.
Figure 25:
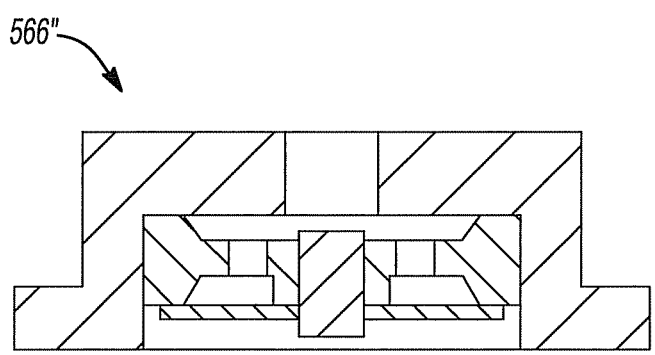
FIG. 25 shows an example of a check valve that may be implemented at the outlet side of any one of the solenoid valve cartridges for the embodiments shown in FIGS. 21 and 22.

Within the recess 604c in the rod guide component 604 is positioned an additional valve 666 (hereinafter simply "valve" 666). The valve 666 may comprise a valve disc stack, a coil spring or disc blow-off stack, or a check valve as shown in FIGS. 23-25, or virtually any other type of pressure responsive valve structure. The various modifications provided in connection with the discussion of the valve 566 shown in FIG. 21 are all possible with the valve 666 as well. The valve 666 shown in FIGS. 26 and 26a has at least one disc 666a held by a washer 666d about a rivet 666c. The disc 666a is effectively clamped against a lower edge 614h of the valve body 614a to close off the outlet 614g of the digital valve 614, and thus block the flow out through the outlet 614g along a flow path 666b when the fluid flow through the digital valve 614 has insufficient pressure to overcome the biasing force being provided to the disc 666a. The area of the passage way defined between lower edge 614h and inner clamping edge 614m defines the effective pressure area for valve disc 666a. Thereby, the opening force required to displace the disc 666a away from its clamped position is directly related to the differential pressure acting upon the disc, which enables the valve 666 to behave as a pressure-regulating valve assembly.

However, when the predetermined pressure is reached, the perimeter of the disc 666a will be forced away from its seated position against the valve body 614a to an open position, and thus will permit flow out through the outlet 614g and the flow path 666b into the reserve chamber 650. The valve 666 in this example thus forms a pressure relief valve that provides an additional means of tuning the damping characteristics of the shock absorber 20'.

The construction of the shock absorber 20' as shown in FIG. 26 provides the added benefit that the PCBA 612 is positioned externally and adjacent to reserve tube edge 636a or the upper surface of the rod guide component 604. Thus, either roll closure or crimp closure of the shock absorber 20' can be performed.

With this configuration, the PCBA 612 does not need to be pre-assembled with the other components within the rod guide assembly 600 prior to forming the reserve tube 636 and the reserve tube edge 636a. This provides additional flexibility in assembling the shock absorber 20'.

Figure 27:
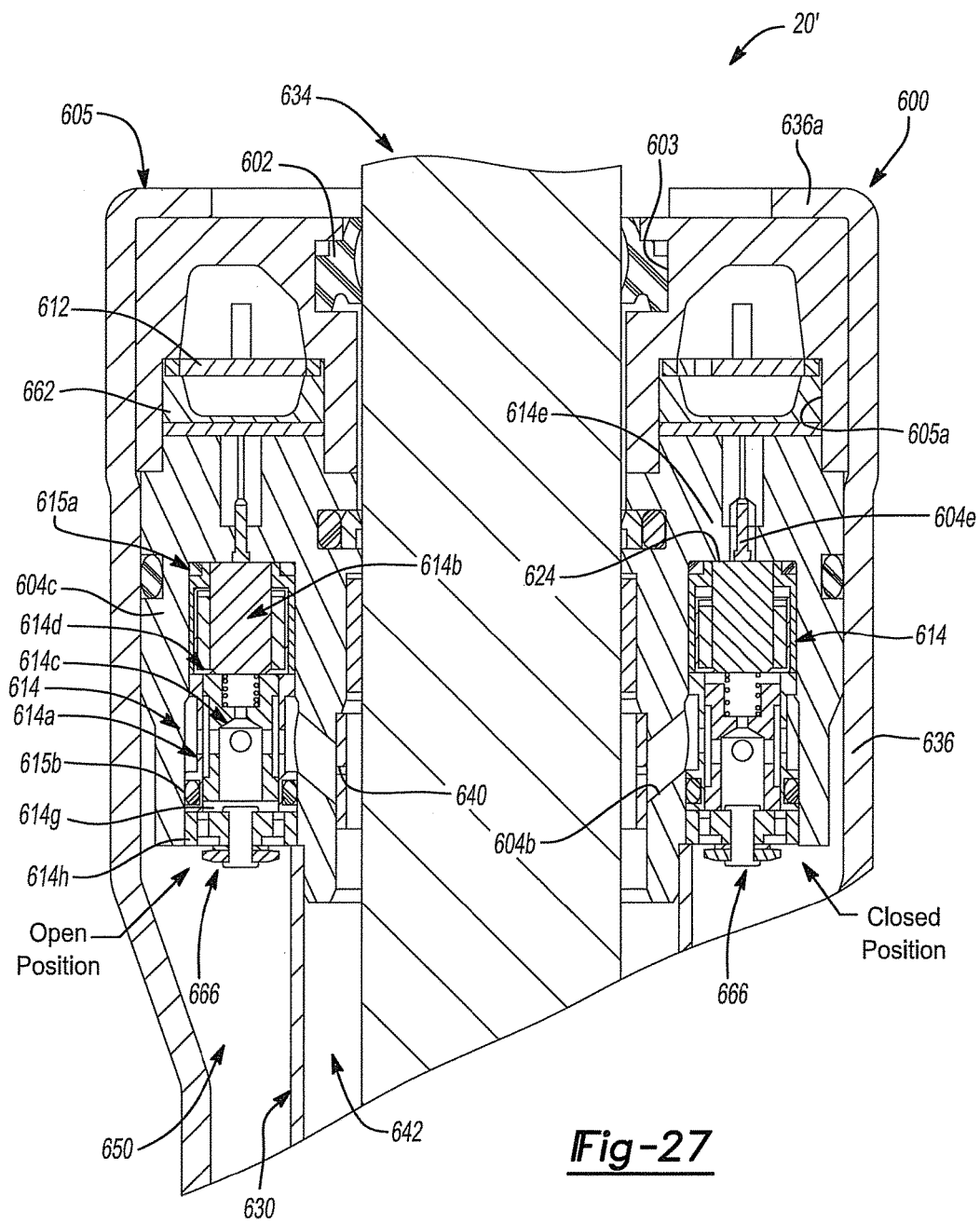
FIG. 27 illustrates another embodiment in which an electronic printed circuit board assembly is assembled internal to the shock absorber along with the coil and spool valve components.

FIG. 27 shows the shock absorber 20' of FIG. 26 with a modification in that the reserve tube 636 is formed with an extended length that is able to encapsulate the upper cap 605 and the PCBA 612. However, it will be appreciated that this construction requires the rod guide component 604, the PCBA 612, the digital valves 614, the valves 666, and the upper cap 605 to all be assembled in place prior to forming the reserve tube 636 and its flange 636a to encapsulate the above-listed components. It also requires the wire egress to be sealed from damper hydraulic pressures. Its operation and construction is otherwise substantially identical to that described for the shock absorber 20' of FIGS. 26 and 26a.

FIG. 28 illustrates a curve 700 representing the pressure differential profile of the fluid flow through the rod guide assembly 500 or 600 at which different components of the shock absorber 20' may be used to help tailor the damping characteristics. A curve 702 is shown which represents the fluid flow control through the rod guide assembly 500 or 600 using just the orifice tube (538 or 638) and an associated digital valve 514 or 614 (i.e., no additional valve 566 or 666 at the outlet of the digital valve). As illustrated by the curve 700, the use of the additional valve 556 or 666 with each digital valve 514/614 enables four distinct control schemes to be used to alter the pressure differential of the fluid flow through the rod guide assembly 500 or 600: 1) bleed orifice area control; 2) spring disc rate control; 3) spring disc travel limit control; and 4) orifice area control. These four control schemes can be employed separately or together, if desired, to more precisely tailor the pressure differential of the fluid flow through the rod guide assembly 500/600 into the reserve tube 536/636 of the shock absorber 20', and thus the overall damping characteristics of the shock absorber at various fluid flow rates.

FIG. 29 shows a plurality of curves illustrating the different fluid flow characteristics that can be achieved using four digital valves 514 or 614, along with the additional valves 566 and 666, in comparison to what may be achieved using just orifice flow control along with the digital valves 514/614. Curves 800, 802, 804 and 806 represent flow characteristics that may be achieved by activing different combinations of four of the digital valves 514/614. Curves 800, 808, 810 and 812 represent the flow characteristics that can be obtained using just the orifice control and digital valve 514/614. As should be apparent, the implementation of the additional valve 566/666 enables significantly enhanced control over the fluid flow characteristics over a wide flow range.

It will also be appreciated that the additional pressure regulated valves 566/666 are applicable to all of the digital valve arrangements described herein. For example, the side inlet and side outlet arrangement (such as shown in FIG. 5) could include the additional pressure-regulated valves by modifying either the rod guide component, or by adding an adjacent component to redirect fluid flow through passages leading to the additional pressure-regulated valves. Accordingly, the present disclosure and explanation of the implementation of the additional pressure regulated valves is not limited to only the downward outlet arrangement shown and discussed in connection with FIGS. 21-28. Any of the embodiments described in the present disclosure could make use of the additional pressure-regulated valves described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, and devices to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, and/or components, but do not preclude the presence or addition of one or more other features, elements, components, and/or groups thereof.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A shock absorber comprising:
   a pressure tube forming a pressure chamber;
   a piston rod disposed within the pressure chamber;
   a reserve tube defining a reserve chamber adjacent the pressure tube;
   a rod guide assembly concentrically disposed about the piston rod and the pressure chamber;
   a plurality of digital valves disposed in the rod guide assembly, each one of said digital valves including a component which is moveable between an open state and a closed state, and operating to control a fluid flow between the pressure chamber and the reserve chamber;
   an electronic control system disposed on a printed circuit board assembly (PCBA) for controlling actuation of the digital valves; and
   at least one additional valve associated with one of the digital valves for further controlling a flow of fluid between the pressure chamber and the reserve chamber, wherein the at least one additional valve is positioned in series with one of said plurality of digital valves and all of the fluid flowing through the one of said plurality of digital valves flows through said at least one additional valve.

2. The shock absorber of claim 1 wherein:
the rod guide assembly includes an upper rod guide and a lower rod guide; and
the printed circuit board assembly is disposed between the upper rod guide and the lower rod guide.

3. The shock absorber of claim 1, wherein at least one of the digital valves comprises a solenoid valve cartridge having a valve element movable between the open and closed states.

4. The shock absorber of claim 1, wherein at least one of the digital valves comprises:
a coil able to be electrically energized by signals from the electronic control system;
a valve body; and
a valve spool element disposed for linear sliding movement within the valve body and movable between two positions, the two positions defining a fully closed position and a fully open position.

5. The shock absorber of claim 1 wherein the at least one additional valve comprises at least one of:
a clamped disc stack;
a pressure relief valve; or
a check valve.

6. The shock absorber of claim 1, wherein the at least one additional valve is disposed within a recess in the rod guide assembly.

7. The shock absorber of claim 1, wherein the at least one additional valve is clamped to a portion of the rod guide assembly adjacent an outlet side of the digital valve.

8. The shock absorber of claim 1, further comprising an outlet reservoir disposed adjacent the at least one additional valve for containing a subquantity of the fluid and preventing a pressure bleed down condition from occurring within the rod guide assembly.

9. The shock absorber of claim 1 further comprising:
an orifice tube having at least one or more holes, the orifice tube being concentrically disposed with the rod guide assembly such that each one of the holes defines a flow inlet into the rod guide assembly.

10. The shock absorber of claim 9, wherein each one of the one or more holes communicates with a radially arranged inlet port of the rod guide assembly.

11. The shock absorber of claim 1, wherein each of the digital valves includes a separate said additional valve.

12. The shock absorber of claim 1, wherein the reserve tube is formed such that it at least partially encapsulates the PCBA.

13. The shock absorber of claim 1, wherein the PCBA is disposed externally of the reserve tube; and
wherein an upper cap covers the PCBA and an upper portion of at least one of the reserve tube or a rod guide component associated with the rod guide assembly.

14. A shock absorber comprising:
a pressure tube forming a pressure chamber;
a piston rod disposed within the pressure chamber;
a reserve tube defining a reserve chamber circumscribing the pressure tube;
a rod guide assembly concentrically disposed about the piston rod and the pressure chamber, the rod guide assembly including a plurality of recesses formed therein, each of the recesses being in communication with an associated one of a plurality of radially extending inlet ports;
a flow area control component having a plurality of holes, the flow area control component being arranged concentrically with the rod guide assembly such that the plurality of holes registers with an associated one of the radially extending inlet ports;
a plurality of digital valves disposed in the recesses of the rod guide assembly, each one of said digital valves including a component which is moveable between an open state and a closed state, and operating to either block fluid flow through its associated one of the radially extending inlet ports, or to permit fluid flow through its associated one of the radially extending inlet ports to an associated outlet port, to thus control a fluid flow between the pressure chamber and the reserve chamber;
an electronic control system disposed on a printed circuit board assembly (PCBA) for controlling actuation of the digital valves; and
a plurality of additional valves each being associated with a respective one of the digital valves and disposed within the rod guide assembly, for further controlling a flow of fluid through its associated said digital valve.

15. The shock absorber of claim 14, wherein the additional valves each comprise a pressure-regulated valve.

16. The shock absorber of claim 15, wherein the pressure-regulated valve comprises at least one of:
a clamped disc stack;
a pressure relief valve; or
a check valve.

17. The shock absorber of claim 14, wherein at least one of the plurality of digital valves comprises a solenoid valve assembly.

18. The shock absorber of claim 14, wherein at least one of the plurality of digital valves comprises:
a coil able to be electrically energized by signals from the electronic control system;
a valve body; and
a valve spool element disposed for linear sliding movement within the valve body and movable between two positions, the two positions defining a fully closed position and a fully open position.

19. The shock absorber of claim 14, wherein the rod guide comprises:
an upper rod guide and a lower rod guide; and
wherein the PCBA is disposed between the upper rod guide and the lower rod guide.

20. The shock absorber of claim 14, wherein:
the PCBA is disposed externally of the reserve tube; and
the PCBA and a portion of the rod guide is covered by an upper cap.

21. A method of forming a shock absorber comprising:
using a pressure tube to form a pressure chamber;
disposing a piston rod within the pressure chamber;
using a reserve tube to define a reserve chamber adjacent the pressure tube;
disposing a rod guide assembly concentrically about the piston rod and the pressure chamber;
using a plurality of digital valves disposed in the rod guide assembly to control fluid flow between the pressure chamber and reserve chamber;
using an electronic control system disposed on a printed circuit board assembly (PCBA) to control actuation of the digital valves; and
positioning at least one additional valve in the rod guide assembly and in series with an associated one of the digital valves for further controlling a flow of fluid between the pressure chamber and the reserve chamber.

22. A shock absorber comprising:
a pressure tube forming a pressure chamber;
a piston rod disposed within the pressure chamber;

a reserve tube defining a reserve chamber adjacent the pressure tube;

a rod guide assembly concentrically disposed about the piston rod and the pressure chamber;

a plurality of digital valves disposed in the rod guide assembly, each one of said digital valves including a component which is moveable between an open state and a closed state, and operating to control a fluid flow between the pressure chamber and the reserve chamber;

an electronic control system disposed on a printed circuit board assembly (PCBA) for controlling actuation of the digital valves; and at least one additional valve disposed in the rod guide assembly and associated with one of the digital valves for further controlling a flow of fluid between the pressure chamber and the reserve chamber, wherein the at least one additional valve is positioned in series with one of said plurality of digital valves.

\* \* \* \* \*